US012716502B2

(12) United States Patent
Tsukamoto et al.

(10) Patent No.: US 12,716,502 B2
(45) Date of Patent: Aug. 25, 2026

(54) SLIDING COMPONENT

(71) Applicant: EAGLE INDUSTRY CO., LTD., Tokyo (JP)

(72) Inventors: Takahiro Tsukamoto, Tokyo (JP); Ryosuke Uchiyama, Tokyo (JP); Gai Yamaguchi, Tokyo (JP); Yuta Negishi, Tokyo (JP); Hiroshi Suzuki, Tokyo (JP); Tadatsugu Imura, Tokyo (JP); Iwa Ou, Tokyo (JP); Shogo Fukuda, Tokyo (JP); Kenta Uchida, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 43 days.

(21) Appl. No.: 18/685,144

(22) PCT Filed: Jul. 27, 2022

(86) PCT No.: PCT/JP2022/028963

§ 371 (c)(1),
(2) Date: Feb. 20, 2024

(87) PCT Pub. No.: WO2023/026756

PCT Pub. Date: Mar. 2, 2023

(65) Prior Publication Data

US 2025/0137484 A1 May 1, 2025

(30) Foreign Application Priority Data

Aug. 25, 2021 (JP) ................................ 2021-137308

(51) Int. Cl.
*F16J 15/34* (2006.01)

(52) U.S. Cl.
CPC .................................... *F16J 15/34* (2013.01)

(58) Field of Classification Search
CPC ...... F16J 15/34; F16J 15/3404; F16J 15/3408; F16J 15/3416
See application file for complete search history.

(56) References Cited

U.S. PATENT DOCUMENTS 1,876,515 A 9/1932 Emmet et al.
2,244,450 A 6/1941 Erni
(Continued)

FOREIGN PATENT DOCUMENTS

CN 1245552 2/2000 ............... F16J 15/34
CN 1401924 3/2003 ............... F16J 15/16
(Continued)

OTHER PUBLICATIONS

U.S. Appl. No. 18/685,181, filed Feb. 20, 2024, Imura et al.
(Continued)

*Primary Examiner* — Gilbert Y Lee
(74) *Attorney, Agent, or Firm* — HAYES SOLOWAY P.C.

(57) ABSTRACT

There is provided a sliding component that allows a fluid to be easily introduced into a spiral groove. A sliding component includes a pair of sliding rings that slide relative to each other, and a spiral groove communicating with a space on a leakage side is provided on a sliding surface of the sliding ring. An expansion portion continuous from the sliding surface of the one sliding ring and expanded toward the space is formed at an edge portion on a side of the space. The expansion portion is provided with an inclined groove continuous with the spiral groove and extending toward the space.

9 Claims, 15 Drawing Sheets

(56) References Cited

U.S. PATENT DOCUMENTS 3,380,040 A 4/1968 Liggett ................. F16C 17/045
3,383,116 A 5/1968 Carter ............................ 277/96
3,527,465 A 9/1970 Guinard
3,675,935 A 7/1972 Ludwig .................. F16J 15/342
3,695,789 A 10/1972 Jansson ................. F01C 21/003
3,704,019 A 11/1972 McHugh ....................... 277/400
3,782,737 A 1/1974 Ludwig et al. ................. 277/27
3,855,624 A 12/1974 Reinhoudt
4,056,478 A 11/1977 Capelli .................... C01M 5/00
4,071,253 A 1/1978 Heinen et al. .................... 277/3
4,523,764 A 6/1985 Albers et al. ..................... 277/3
4,889,348 A 12/1989 Amundson ................... 277/306
5,071,141 A 12/1991 Lai et al.
5,092,612 A 3/1992 Victor et al. ................. 277/96.1
5,174,584 A 12/1992 Lahrman ....................... 277/400
5,180,173 A 1/1993 Kimura et al.
5,201,531 A 4/1993 Lai
5,224,714 A 7/1993 Kimura ......................... 277/400
5,316,455 A 5/1994 Yoshimura .......... F04C 29/0021
5,447,316 A 9/1995 Matsui .......................... 277/400
5,556,111 A 9/1996 Sedy ............................ 277/400
5,558,341 A 9/1996 McNickle ..................... 277/400
5,769,604 A 6/1998 Gardner et al. ........... 415/170.1
5,834,094 A 11/1998 Etsion et al. ................. 428/156
5,947,481 A 9/1999 Young ........................... 277/400
5,952,080 A 9/1999 Etsion et al. ................. 428/156
6,002,100 A 12/1999 Etsion ...................... 219/121.71
6,046,430 A 4/2000 Etsion ...................... 219/121.71
6,135,458 A 10/2000 Fuse ............................ 277/401
6,152,452 A 11/2000 Wang ........................... 277/400
6,213,473 B1 4/2001 Lebeck
6,446,976 B1 9/2002 Key et al. ................ F16J 15/34
6,692,006 B2 2/2004 Holder .......................... 277/346
6,726,213 B2 4/2004 Wang ........................... 277/400
7,258,346 B2 8/2007 Tejima ......................... 277/399
7,377,518 B2 5/2008 Lai ............................... 277/400
7,758,051 B2 7/2010 Roberts-Haritonov ....... 277/401
7,931,277 B2 4/2011 Garrison ...................... 277/399
8,100,405 B2 1/2012 Kneeland et al. ............ 277/355
8,342,534 B2 1/2013 Vasagar ....................... 277/399
8,585,060 B2 11/2013 Oshii et al. ................... 277/401
9,062,775 B2 * 6/2015 Short ................... F16J 15/3412
9,151,390 B2 10/2015 Hosoe .................. F16J 15/3412
9,169,931 B2 10/2015 Tokunaga ................ F16J 15/34
9,228,660 B2 1/2016 Hosoe .................. F16J 15/3412
9,353,867 B2 5/2016 Itadani et al. ....... F16J 15/3448
9,494,239 B2 11/2016 Hosoe .................... F16J 15/342
9,512,923 B2 12/2016 Inoue et al. ............. F16J 15/34
9,574,666 B2 2/2017 Ferris ................... F16J 15/3412
9,574,667 B2 2/2017 Takahashi et al. .... F16J 15/342
9,772,037 B2 9/2017 Itadani et al. ....... F16J 15/3412
9,784,372 B2 10/2017 Iguchi .................... F16J 15/342
9,863,473 B2 1/2018 Hosoe et al. ......... F16C 33/741
9,958,010 B2 5/2018 Itadani ..................... F16C 33/74
9,982,715 B2 5/2018 Gorges et al. ........ F16C 33/201
10,054,230 B2 8/2018 Katori et al. ........ F16J 15/3412
10,132,411 B2 11/2018 Hosoe et al. .......... F16J 15/164
10,337,620 B2 7/2019 Tokunaga et al. ..... F16J 15/342
10,443,737 B2 10/2019 Itadani ................... F16J 15/342
10,495,228 B2 12/2019 Itadani ................... F16J 15/342
10,865,883 B2 12/2020 Seki et al. ........... F16J 15/3404
11,053,975 B2 7/2021 Imura ................... F16C 17/045
11,125,335 B2 9/2021 Kimura et al.
11,248,706 B2 2/2022 Imura ..................... F16C 33/74
11,320,052 B2 5/2022 Imura et al. ............. F16J 15/34
11,821,521 B2 11/2023 Imura et al.
11,913,454 B2 2/2024 Suzuki .................... F04C 29/00
12,000,488 B2 6/2024 Lang et al.
12,498,044 B2 12/2025 Suzuki
2002/0014743 A1 2/2002 Zheng ...................... F16J 15/34
2002/0093141 A1 7/2002 Wang ....................... F16J 15/34
2002/0158416 A1 10/2002 Hosanna .............. F16J 15/3404
2004/0080112 A1 4/2004 Tejima ................. F16J 15/3436
2005/0135957 A1 6/2005 Park .................... F04C 18/0215
2005/0212217 A1 9/2005 Tejima ......................... 277/399
2005/0263963 A1 12/2005 Lai ............................... 277/399
2007/0228664 A1 10/2007 Anand ................. F16J 15/3496
2007/0267820 A1 11/2007 Martin ................. F16J 15/3496
2007/0275267 A1 11/2007 Sabouni ............... F16J 15/3496
2007/0296156 A1 12/2007 Yanagisawa et al. ........ 277/352
2008/0050260 A1 2/2008 Iwanami et al. ............. 418/55.6
2008/0100001 A1 5/2008 Flaherty
2009/0200749 A1 8/2009 Teshima ............... F16J 15/3484
2011/0194966 A1 8/2011 Takeuchi ............ F04B 18/0215
2011/0215531 A1 9/2011 Tokunaga et al. ............ 277/399
2011/0215535 A1 9/2011 Vasagar ........................ 277/559
2011/0305871 A1 12/2011 Tabuchi ............... F16J 15/3284
2012/0018957 A1 1/2012 Watanabe ................ F16J 15/34
2012/0217705 A1 8/2012 Hosoe ........................... 277/400
2012/0280458 A1 11/2012 Artiles et al.
2013/0168928 A1 7/2013 Schrufer .............. C10M 103/02
2013/0209011 A1 8/2013 Tokunaga
2013/0323105 A1 12/2013 Chao et al. ........... F04C 29/028
2014/0159314 A1 6/2014 Hosoe ...................... F16J 15/34
2014/0197600 A1 7/2014 Hosoe .................... F16J 15/342
2014/0217676 A1 8/2014 Hosoe et al. ................ 277/350
2014/0319776 A1 10/2014 Theike et al.
2015/0115540 A1 4/2015 Tokunaga ................ F16J 15/34
2015/0123350 A1 5/2015 Itadani ................. F16J 15/3412
2015/0167847 A1 6/2015 Tokunaga
2015/0184752 A1 7/2015 Itadani ................. F16J 15/3412
2015/0345641 A1 12/2015 Lattin
2015/0345642 A1 12/2015 Haas .................... F16J 15/3496
2015/0377297 A1 12/2015 Tokunaga et al. .... F16C 33/748
2016/0033045 A1 2/2016 Itadani et al. ....... F16J 15/3412
2016/0097457 A1 4/2016 Sun et al. ............ F16J 15/3412
2017/0089467 A1 3/2017 Young .................. F01D 11/003
2017/0146014 A1 5/2017 Ohta et al. .......... F04C 29/0021
2017/0241549 A1 8/2017 Itadani ................. F16J 15/3412
2017/0261107 A1 9/2017 Martin ................. F16J 15/3452
2017/0350407 A1 12/2017 Yamamoto et al. .. F04D 29/046
2018/0017163 A1 1/2018 Hosoe et al. .......... F16J 15/164
2018/0073394 A1 3/2018 Tokunaga et al. ...... F01D 25/18
2018/0106157 A1 4/2018 Kovacik et al. ........ F01D 11/01
2018/0112711 A1 4/2018 Itadani ................... F16J 15/363
2018/0128377 A1 5/2018 Tukunaga et al. ..... F16J 15/342
2018/0128378 A1 5/2018 Tokunaga et al. ..... F16J 15/342
2018/0135699 A1 5/2018 Tokunaga et al. ...... F16C 33/80
2018/0172162 A1 6/2018 Tokunaga et al. ....... F16J 15/34
2018/0195618 A1 7/2018 Itadani et al. ....... F16J 15/3416
2018/0299015 A1 10/2018 Itadani ................. F16J 15/3448
2019/0169988 A1 6/2019 Tokunaga et al. ...... F01C 19/12
2019/0170257 A1 6/2019 Hosoe et al. ........ F16J 15/3412
2019/0285115 A1 9/2019 Negishi et al. ....... F16C 17/045
2019/0301522 A1 10/2019 Negishi et al. ......... F16C 17/02
2019/0331162 A1 10/2019 Negishi .................... F16J 15/34
2019/0376558 A1 12/2019 Kimura et al.
2020/0141444 A1 5/2020 Thatte ..................... F16C 17/08
2020/0224722 A1 7/2020 Imura ................... F16C 33/743
2020/0224768 A1 7/2020 Imura .................. F16J 15/3412
2020/0240470 A1 7/2020 Sorgenti ............... F16J 15/3212
2020/0332901 A1 10/2020 Imura .................. F16J 15/3412
2021/0041026 A1 2/2021 Imura .................. F16J 15/3424
2021/0048062 A1 2/2021 Masumi et al. ...... F16C 17/102
2021/0048106 A1 2/2021 Imura et al. ......... F16J 15/3412
2021/0080009 A1 3/2021 Kimura et al. ...... F16J 15/3412
2021/0116030 A1 4/2021 Kimura et al. ........ F16J 15/182
2021/0116032 A1 4/2021 Kimura .................. F16J 15/188
2021/0364034 A1 11/2021 Okada .................... F16J 15/342
2022/0056949 A1 2/2022 Ikeda et al. ............. F16C 17/04
2022/0145931 A1 5/2022 Imura
2022/0196152 A1 6/2022 Imura
2023/0027772 A1 1/2023 Suzuki et al. .......... F16C 17/02
2023/0258182 A1 8/2023 Suzuki ................ F04C 18/0215

FOREIGN PATENT DOCUMENTS

CN 101644333 2/2010 ............... F16J 15/34
CN 201496542 6/2010 ............... F16J 15/16
CN 101793324 8/2010 ............... F16J 15/16
CN 203098871 7/2013 ............... F16J 15/34
CN 103557229 2/2014 .............. F16C 17/04
CN 103557334 2/2014 ............... F16J 15/34
CN 203641506 6/2014 ............... F16J 15/16

(56) References Cited

FOREIGN PATENT DOCUMENTS

| | | | |
|---|---|---|---|
| CN | 205244387 | 5/2016 | F16J 15/16 |
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 109237042 | 1/2019 | F16J 15/34 |
| CN | 110925426 | 3/2020 | F16J 15/16 |
| CN | 111306302 | 6/2020 | F16J 15/3288 |
| CN | 210800068 U | 6/2020 | |
| CN | 213899890 U | 8/2021 | |
| DE | 102008038396 | 2/2010 | |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 3575621 | 12/2019 | F16C 33/10 |
| EP | 3575643 | 12/2019 | F16J 15/34 |
| EP | 3650722 | 5/2020 | F16C 33/12 |
| FR | 2342440 | 9/1997 | F16J 15/34 |
| GB | 1509482 | 5/1978 | F16C 33/10 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |
| JP | H05-99344 | 4/1983 | F16J 15/34 |
| JP | S59-195253 | 12/1984 | F16J 15/34 |
| JP | S59-195254 | 12/1984 | F16J 15/34 |
| JP | S59-231269 | 12/1984 | F16J 15/34 |
| JP | S59231268 | 12/1984 | |
| JP | S61-8402 | 1/1986 | F01C 1/01 |
| JP | S61-82177 | 5/1986 | F16J 15/34 |
| JP | S62-31775 | 2/1987 | F16J 15/34 |
| JP | S63-134883 | 6/1988 | F04C 18/02 |
| JP | H02-16381 | 1/1990 | F04C 18/02 |
| JP | H02-236067 | 9/1990 | F16J 15/34 |
| JP | H02-136863 | 11/1990 | F16J 15/34 |
| JP | H04-50559 | 2/1992 | F16J 15/34 |
| JP | H04-337165 | 11/1992 | F16J 15/34 |
| JP | H04-362289 | 12/1992 | F04C 18/02 |
| JP | H05-60247 | 3/1993 | F16J 15/34 |
| JP | H05-296248 | 11/1993 | |
| JP | H06-117547 | 4/1994 | F16J 15/34 |
| JP | H06-174107 | 6/1994 | F16J 15/34 |
| JP | H06-105105 | 12/1994 | F16J 15/34 |
| JP | H07-43038 | 5/1995 | F16J 15/34 |
| JP | H08-296745 A2 | 11/1996 | |
| JP | 9-89119 | 3/1997 | F16J 15/34 |
| JP | H09228968 | 9/1997 | F01C 17/06 |
| JP | 9-292034 | 11/1997 | F16J 15/34 |
| JP | H10-281299 | 10/1998 | F16J 15/34 |
| JP | H10-292867 | 11/1998 | |
| JP | H10-339286 | 12/1998 | F04C 18/02 |
| JP | H11-132163 | 5/1999 | F04C 18/02 |
| JP | H11-287329 | 10/1999 | F16J 15/34 |
| JP | H11-303858 | 11/1999 | F16C 17/10 |
| JP | 3066367 | 5/2000 | F16J 15/34 |
| JP | 2001/12458 | 1/2001 | F16C 17/10 |
| JP | 2003-343730 | 12/2003 | F16J 15/22 |
| JP | 2004-360903 | 12/2004 | F16J 15/447 |
| JP | 2005-155894 | 6/2005 | F16C 17/04 |
| JP | 2005-180652 | 7/2005 | F16J 15/34 |
| JP | 2005-315391 | 11/2005 | |
| JP | 2006-9614 | 1/2006 | F04C 18/08 |
| JP | 2006-77899 | 3/2006 | F16J 15/34 |
| JP | 2006-90524 | 4/2006 | F16C 17/02 |
| JP | 2006-183702 | 7/2006 | F16C 17/04 |
| JP | 2006-316677 | 11/2006 | F04C 18/02 |
| JP | 2007-162045 | 6/2007 | |
| JP | 2007-263374 | 10/2007 | F16J 15/34 |
| JP | 2011-74931 | 4/2011 | F16J 15/34 |
| JP | 2012-2295 | 1/2012 | F16J 15/34 |
| JP | 2012-062534 | 3/2012 | |
| JP | 2012-82794 | 4/2012 | F04C 18/02 |
| JP | 2012-122135 | 6/2012 | C25D 15/02 |
| JP | 2013-167216 | 8/2013 | F04C 18/02 |
| JP | 2013-213545 | 10/2013 | F16C 32/06 |
| JP | 2014-529052 | 10/2014 | |
| JP | 2015-063647 | 4/2015 | |
| JP | 2015-68330 | 4/2015 | F04C 29/00 |
| JP | 5693599 | 4/2015 | |
| JP | 2015-183631 | 10/2015 | F04C 2/10 |
| JP | 2016-80090 | 5/2016 | F16J 15/34 |
| WO | WO2013053411 | 4/2013 | |
| WO | WO2014061544 | 4/2014 | |
| WO | WO2018139231 | 8/2018 | F16J 15/34 |
| WO | WO2018139232 | 8/2018 | F16C 33/10 |
| WO | WO2020032086 | 2/2020 | F16J 15/34 |

OTHER PUBLICATIONS

U.S. Appl. No. 18/685,139, filed Feb. 20, 2024, Yamaguchi et al.

International Search Report, Written Opinion and International Preliminary Report on Patentability issued in PCT/JP2022/028961, dated Sep. 6, 2022, with English translation, 20 pages.

International Search Report, Written Opinion and International Preliminary Report on Patentability issued in PCT/JP2022/028963, dated Oct. 11, 2022, with English translation, 24 pages.

International Search Report, Written Opinion and International Preliminary Report on Patentability issued in PCT/JP2022/031862, dated Sep. 9, 2022, with English translation, 20 pages.

* cited by examiner

SLIDING COMPONENT

TECHNICAL FIELD

The present invention relates to a sliding component, for example, a sliding component used for a shaft seal or a bearing of a rotating machine.

BACKGROUND ART

As a sliding component that prevents a leakage of a sealed fluid around a rotating shaft of a rotating machine, for example, there is known a mechanical seal including a pair of sliding rings having an annular shape which rotate relative to each other and of which sliding surfaces slide against each other. In such a mechanical seal, in recent years, there has been a demand for reducing sliding-induced energy loss for environmental measures and the like, and a sliding surface of a sliding ring may be provided with positive pressure generation grooves which communicate with a sealed fluid side and of which one ends are closed in the sliding surface.

For example, in a mechanical seal illustrated in Patent Citation 1, on a sliding surface of one sliding ring, a plurality of spiral grooves that are positive pressure generation grooves communicating with a leakage side and not communicating with a sealed fluid side are provided in a circumferential direction with land portions interposed therebetween. According to this configuration, during relative rotation of sliding rings, a fluid on the leakage side is introduced into the spiral grooves, and the fluid on the leakage side concentrates on wall portions of end portions of the spiral grooves in a relative rotation direction to generate positive pressures, so that sliding surfaces are separated from each other, and a fluid film is formed between the sliding surfaces by the fluid on the leakage side. Therefore, lubricity is improved and low friction is realized. In addition, the fluid on the leakage side acts to push a sealed fluid in the vicinities of the end portions of the spiral grooves in the relative rotation direction back to a sealed fluid side, so that the sealed fluid leaking out to the leakage side is reduced.

CITATION LIST

Patent Literature

Patent Citation 1: JP S62-31775 A (Page 2, FIG. 2)

SUMMARY OF INVENTION

Technical Problem

In the mechanical seal of Patent Citation 1, the fluid on the leakage side inside the spiral grooves moves toward the end portions in the relative rotation direction while following relative rotational sliding of a pair of the sliding rings, so that the fluid on the leakage side is continuously supplied from a space on the leakage side into the spiral grooves. However, in the mechanical seal as disclosed in Patent Citation 1, since corner portions formed by bottom surfaces of the spiral grooves and a peripheral surface on the leakage side of the sliding ring are formed at a right angle, when the fluid on the leakage side is introduced from the space on the leakage side into the spiral grooves, a vortex is likely to occur in the vicinities of the corner portions, and the fluid on the leakage side is not effectively introduced into the spiral grooves, so that the amount of the fluid on the leakage side inside the spiral grooves is reduced, which is a risk.

The present invention has been made in view of such problems, and an object of the present invention is to provide a sliding component that allows a fluid to be easily introduced into spiral grooves.

Solution to Problem

In order to solve the foregoing problems, according to the present invention, there is provided a sliding component including a first sliding ring and a second sliding ring that slide relative to each other, first sliding ring and the second sliding ring being disposed between a first space which is one of a sealed fluid side space and a leakage side space and a second space which is remaining one of the sealed fluid side space and the leakage side space, wherein the first sliding ring has a sliding surface provide with a spiral groove that communicates with the first space, the first sliding ring further has an expansion portion formed at an edge portion on the first space such that the expansion portion is continuous from the sliding surface of the first sliding ring and expanded toward the first space, and the expansion portion is provided with an inclined groove continuous with the spiral groove and extending toward the first space. According to the aforesaid feature of the present invention, since a fluid smoothly moves from the first space into the spiral groove along a bottom surface of the inclined groove expanded toward the first space, the fluid is easily introduced into the spiral groove.

It may be preferable that the inclined groove extends to a peripheral surface on a side of the first space. According to this preferable configuration, the fluid is easily introduced into the inclined groove in a radial direction.

It may be preferable that a bottom surface of the spiral groove and a bottom surface of the inclined groove form an obtuse angle. According to this preferable configuration, a vortex is less likely to occur at a boundary portion between the bottom surface of the spiral groove and the bottom surface of the inclined groove.

It may be preferable that the inclined groove is formed by an inclined bottom surface continuous with a bottom surface of the spiral groove and side surfaces rising from both circumferential end edges of the inclined bottom surface. According to this preferable configuration, the fluid is easily introduced from the inclined groove into the spiral groove.

It may be preferable that the inclined groove is formed with a constant depth. According to this preferable configuration, the fluid introduced into the inclined groove moves smoothly and easily along a bottom surface of the inclined groove.

It may be preferable that a depth of the inclined groove is equal to a depth of the spiral groove. According to this preferable configuration, the fluid is easily introduced from the inclined groove into the spiral groove.

It may be preferable that the sliding surface of the first sliding ring is further provided with a reverse spiral groove provided on a side of the second space with respect to the spiral groove and extending in a direction opposite to the spiral groove to generate a dynamic pressure. According to this preferable configuration, during reverse rotation, a fluid on the second space side that has entered the reverse spiral groove on the second space side of the spiral groove follows and moves due to shear with the sliding surface of the first sliding ring, and is returned into a gap between the sliding surfaces from an end portion on the second space side of the reverse spiral groove toward the second space side. Accordingly, lubricity can be enhanced not only during forward rotation but also reverse rotation, and during reverse rotation, a leakage of the fluid on the second space side to the first space side can be reduced.

Here, in this specification, the spiral groove is configured such that an extension direction of the groove has both a radial component and a circumferential component. Similarly, the reverse spiral groove may be configured such that an extension direction of the groove has both a radial component and a circumferential component, and the direction extending from upstream toward downstream in a circumferential direction during relative rotation is opposite to that of the spiral groove.

DESCRIPTION OF EMBODIMENTS

Figure 1:
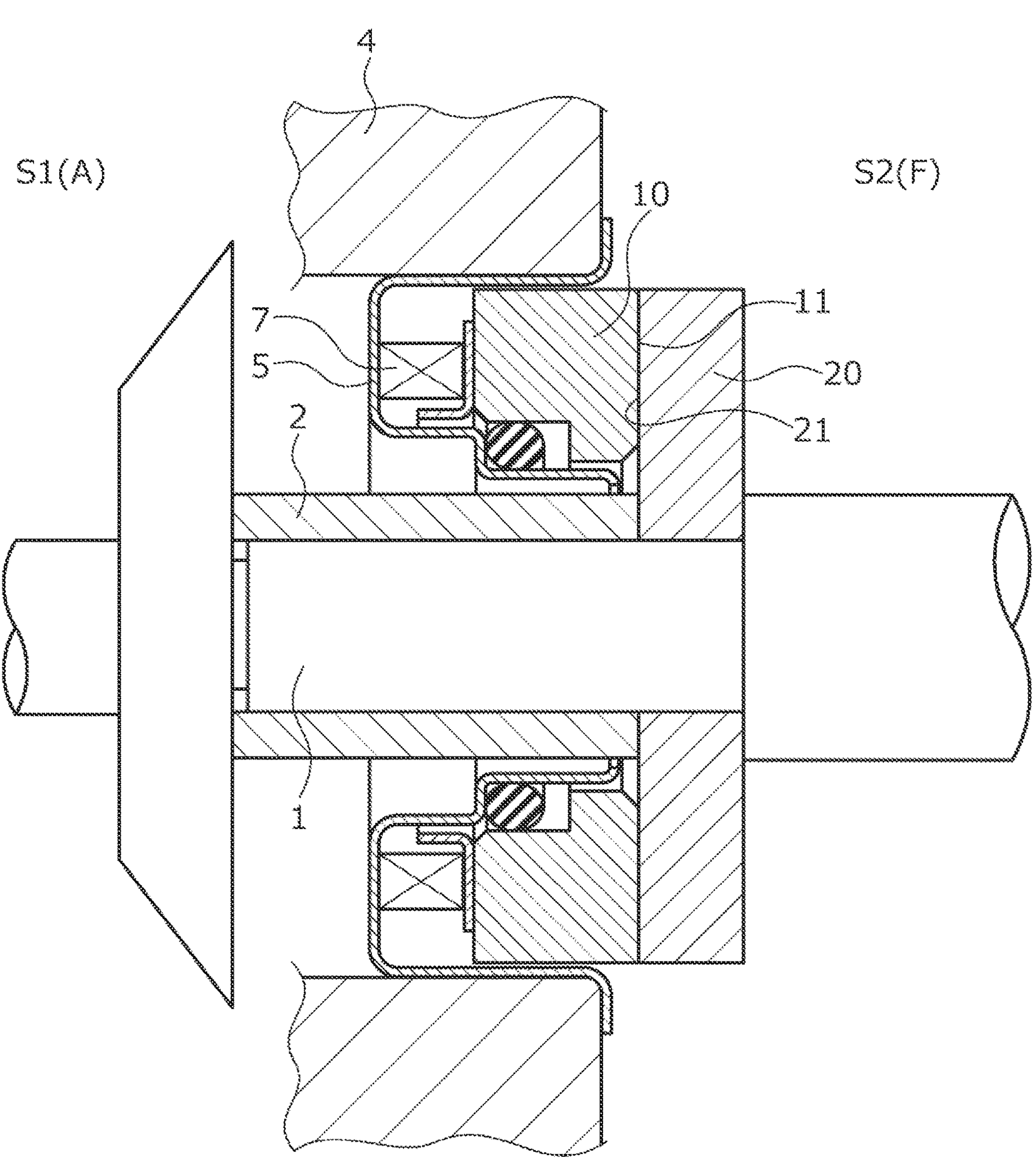
FIG. 1 is a longitudinal sectional view illustrating one example of a mechanical seal as a sliding component according to a first embodiment of the present invention.

Modes for implementing a sliding component according to the present invention will be described below based on embodiments.

First Embodiment

A mechanical seal as a sliding component according to a first embodiment of the present invention will be described with reference to FIGS. 1 to 4. Incidentally, in the present embodiment, a description will be made based on the fact that atmosphere A exists in an inner space S1 of the mechanical seal, a sealed fluid F exists in an outer space S2, a radially inner side of sliding rings forming the mechanical seal is a leakage side (low-pressure side), and a radially outer side is a sealed fluid side (high-pressure side). In addition, for convenience of description, in the drawings, dots may be added to grooves and the like formed on a sliding surface.

A mechanical seal illustrated in FIG. 1 is an inside mechanical seal that seals the sealed fluid F in the outer space S2 which tends to leak from the radially outer side toward the radially inner side of sliding surfaces, and that allows the inner space S1 to communicate with the atmosphere A. Incidentally, in the present embodiment, a mode in which the sealed fluid F is a high-pressure liquid and the atmosphere A is a gas having lower pressure than the sealed fluid F will be provided as an example.

The mechanical seal mainly includes a rotating seal ring 20 as a second sliding ring, and a stationary seal ring 10 as a first sliding ring. The rotating seal ring 20 has an annular shape, and is provided on a rotating shaft 1 so as to be rotatable together with the rotating shaft 1 via a sleeve 2. The stationary seal ring 10 has an annular shape, and is provided on a seal cover 5 fixed to a housing 4 of an attached device, so as to be non-rotatable and movable in an axial direction. The stationary seal ring 10 is biased in the axial direction by an elastic member 7, so that a sliding surface 11 of the stationary seal ring 10 and a sliding surface 21 of the rotating seal ring 20 come into close contact with and slide against each other. Incidentally, the sliding surface 21 of the rotating seal ring 20 is a flat surface, and a recessed portion such as a groove is not provided on the flat surface.

The stationary seal ring 10 and the rotating seal ring 20 are typically made of SiC (as an example of hard material) or a combination of SiC and carbon (as an example of soft material), but are not limited thereto, and any sliding material can be applied as long as the sliding material can be used as a sliding material for a mechanical seal. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN, and as carbon, mixed carbon of a carbonaceous substance and a graphitic substance, resin-molded carbon, sintered carbon, and the like can be used. In addition, in addition to the above-described sliding materials, metal materials, resin materials, surface modification materials (e.g., coating materials), composite materials, and the like can also be applied.

Figure 2:
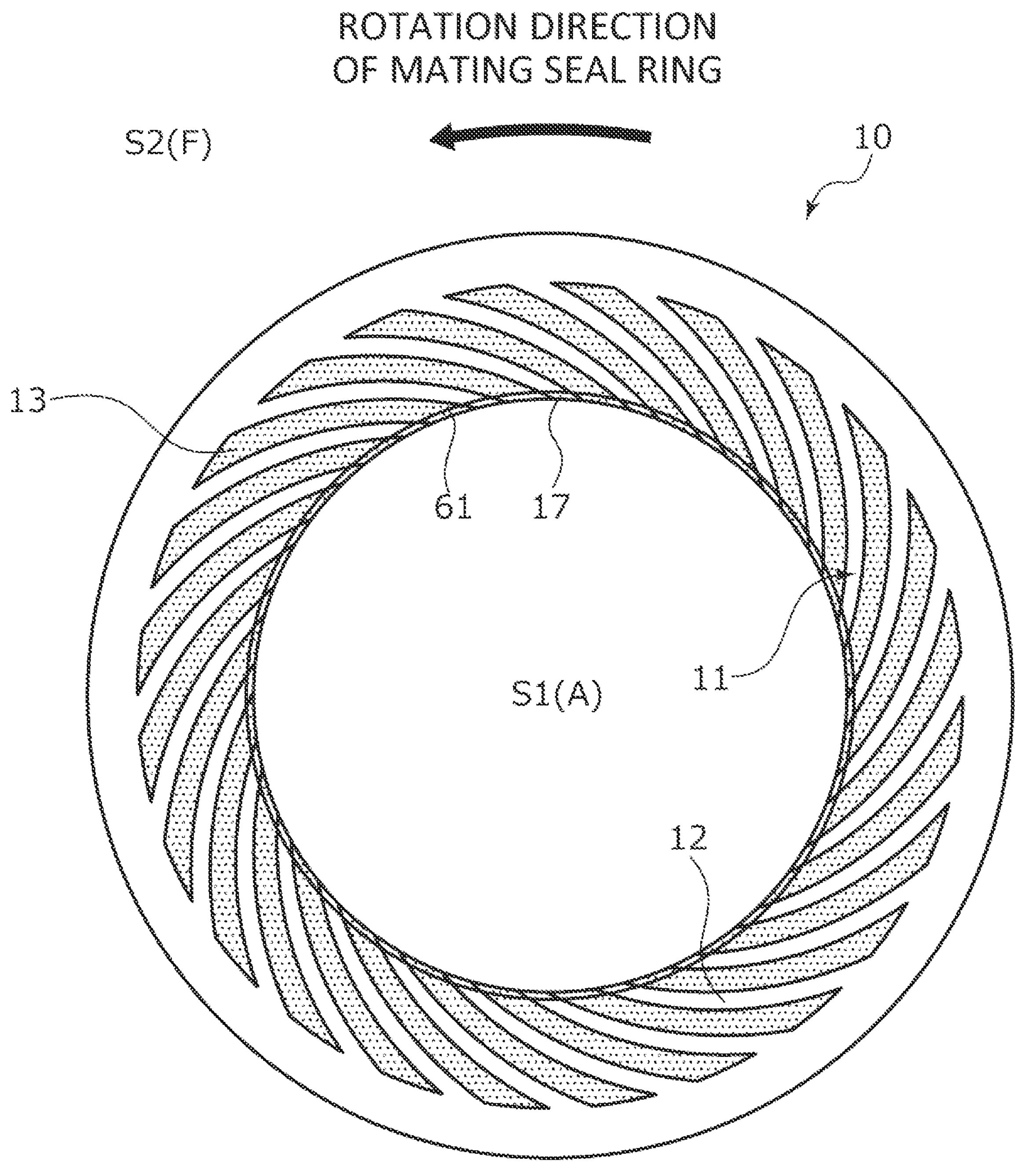
FIG. 2 is a view of a sliding surface of a stationary seal ring in the first embodiment when viewed in an axial direction.
Figure 3:
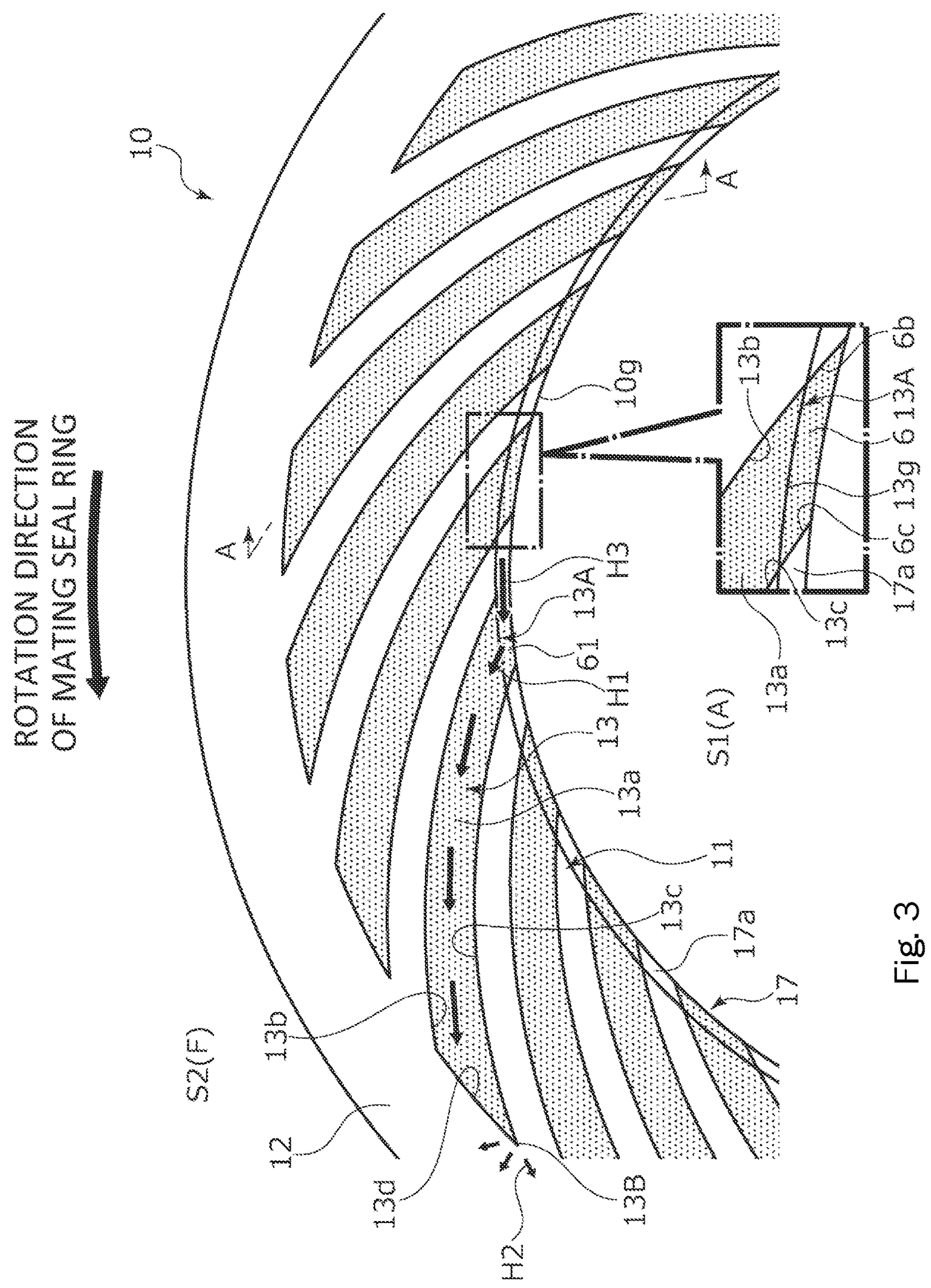
FIG. 3 is an enlarged view of the sliding surface of the stationary seal ring in the first embodiment when viewed in the axial direction.

As illustrated in FIGS. 2 and 3, the rotating seal ring 20 slides counterclockwise relative to the stationary seal ring 10 as indicated by a solid arrow.

A plurality of spiral grooves 13 are provided on the sliding surface 11 of the stationary seal ring 10. The spiral grooves 13 (24 in the present embodiment) are evenly arranged on the radially inner side of the sliding surface 11 in a circumferential direction.

In addition, portions of the sliding surface 11 other than the spiral grooves 13 are lands 12 disposed on the same plane and forming a flat surface. The flat surface of the lands 12 functions as a sliding surface that substantially slides against the sliding surface 21 of the rotating seal ring 20.

In addition, an edge portion on an inner space S1 side of the stationary seal ring 10 is an expansion portion 17 expanded toward the inner space S1, and has a so-called chamfered shape. The expansion portion 17 includes a plurality of inclined grooves 61 and expansion surfaces 17*a*. In other words, the plurality of inclined grooves 61 and expansion surfaces 17*a* are provided at the edge portion on the radially inner side of the sliding surface 11 of the stationary seal ring 10. The expansion surfaces 17*a* (24 in the present embodiment) are arranged between the inclined grooves 61 that are continuous from the sliding surface 11 and that are adjacent to each other in the circumferential direction at the edge portion on the radially inner side of the sliding surface 11. In addition, the inclined grooves 61 extend continuously with the spiral grooves 13.

Figure 4A:
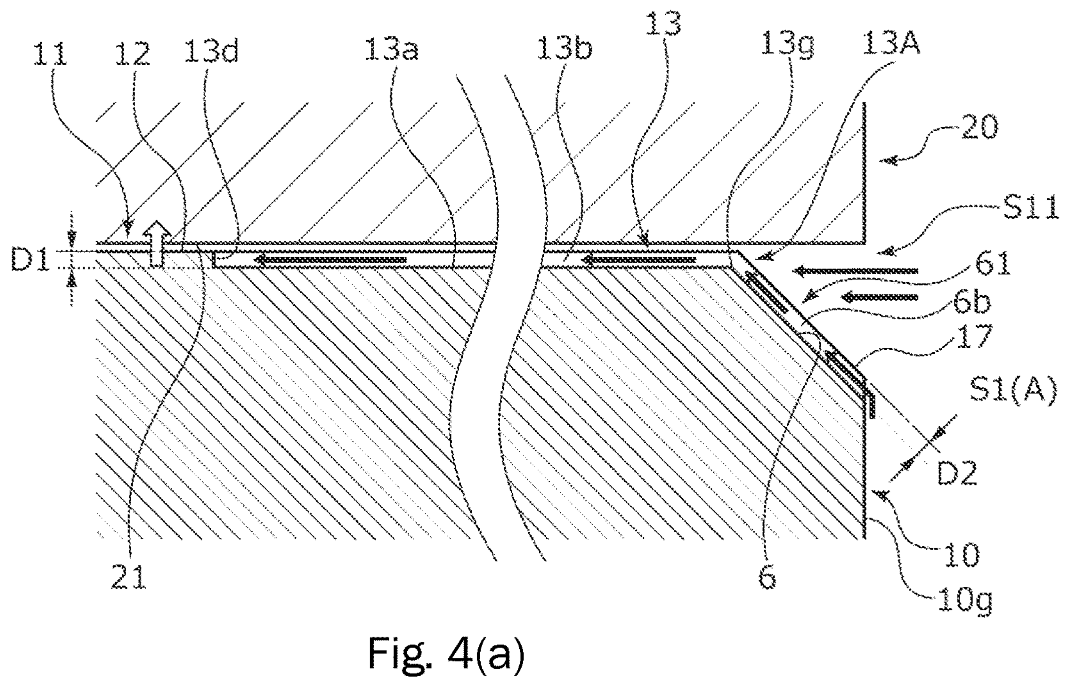
FIG. 4A is a cross-sectional view taken along line A-A of FIG. 3.

In addition, the expansion surfaces 17*a* are tapered surfaces that are inclined to become deeper gradually from the flat surface of the lands 12 toward an inner peripheral surface 10*g* of the stationary seal ring 10 as a peripheral surface on a side of a first space, namely, the inner space S1 side in the present embodiment (refer to FIG. 4A). Incidentally, the expansion surfaces 17*a* may have unevenness, but are preferably flat surfaces.

As illustrated in FIG. 3, the spiral grooves 13 extend in an arcuate shape from the radially inner side toward the radially outer side while being inclined with a counterclockwise component. The spiral grooves 13 communicate with the inner space S1, and do not communicate with the outer space S2.

Figure 4B:
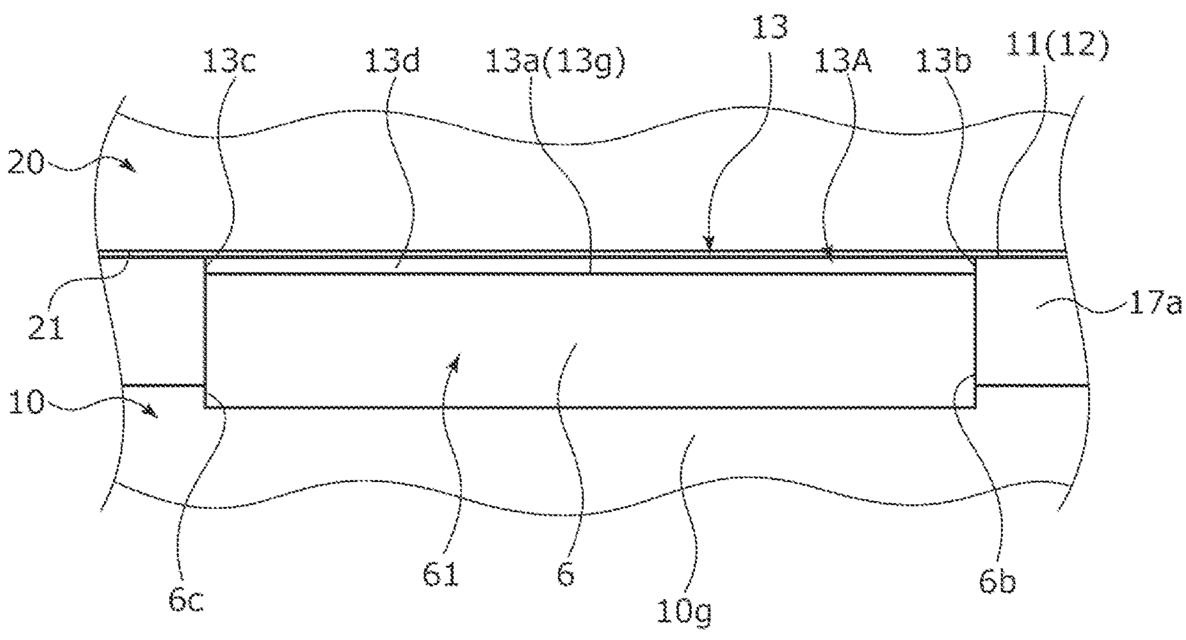
FIG. 4B is a view of spiral grooves and inclined grooves when viewed from a radially inner side.

As illustrated in FIGS. 3 and 4, each of the spiral grooves 13 includes a bottom surface 13*a*, side surfaces 13*b* and 13*c*, and a radially outer-side end surface 13*d*. The bottom surface 13*a* extends parallel to the flat surface of the lands 12 in a radial direction. Namely, the spiral groove 13 is formed with a depth D1 that is constant in an extension direction (refer to FIG. 4A). The side surfaces 13*b* and 13*c* rise from both circumferential end edges of the bottom surface 13*a*. The radially outer-side end surface 13*d* rises from a radially outer end of the bottom surface 13*a*, and is connected to each of radially outer ends of the side surfaces 13*b* and 13*c*. In addition, an opening 13A communicating with the inner space S1 is formed on the radially inner side of the spiral groove 13. In addition, the spiral groove 13 is formed to expand in width from the opening 13A on the radially inner side toward the radially outer-side end surface 13*d*.

The inclined groove 61 that is inclined and extends in a thickness direction of the stationary seal ring 10 and to the inner space S1 side is continuous with the spiral groove 13. In detail, an inclined bottom surface 6 extending to the radially inner side is continuously provided at an end edge 13*g* on the radially inner side of the bottom surface 13*a* of the spiral groove 13. In detail, the inclined bottom surface 6 is a bottom surface of the inclined groove 61, and is inclined and extends linearly such that a depth of the inclined bottom surface 6 becomes deeper from the end edge 13*g* on the radially inner side of the bottom surface 13*a* of the spiral groove 13 toward the inner peripheral surface 10*g* of the stationary seal ring 10, in other words, a distance from the sliding surface 21 of the rotating seal ring 20 increases. In addition, the inclined bottom surface 6 is parallel to the expansion surface 17*a*.

The bottom surface 13*a* of the spiral groove 13 and the inclined bottom surface 6 form an obtuse angle. Incidentally, in the present embodiment, a mode in which the bottom surface 13*a* of the spiral groove 13 and the inclined bottom surface 6 form an obtuse angle is provided as an example; however, the present invention is not limited thereto, and a boundary between the bottom surface 13*a* and the inclined bottom surface 6 may be continuous through a curved surface. In addition, a small step may be formed in a part of the vicinity of the boundary portion between the bottom surface 13*a* and the inclined bottom surface 6.

Namely, the inclined bottom surface 6 expands toward the inner space S1 side in a direction away from the rotating seal ring 20, namely, in a depth direction of the inclined groove 61 (hereinafter, the distance away from the rotating seal ring 20 and the direction thereof may be simply referred to as a "depth" and a "depth direction", respectively). Incidentally, the inclined bottom surface 6 may have unevenness or a curved surface, but is preferably a flat surface.

The inclined bottom surface 6 and the expansion surfaces 17*a* are connected by side surfaces 6*b* and 6*c* rising from both circumferential end edges of the inclined bottom surface 6. The side surfaces 6*b* and 6*c* are continuous with the side surfaces 13*b* and 13*c* of the spiral groove 13 in the radial direction.

Namely, the inclined groove 61 surrounded by the inclined bottom surface 6 and the side surfaces 6*b* and 6*c* is formed at the edge portion on the inner space S1 side of the stationary seal ring 10. Namely, the inclined groove 61 is continuous with the spiral groove 13, and is inclined and extends toward the inner space S1 side in the thickness direction. In other words, the spiral groove 13 communicates with the inner space S1 through the inclined groove 61.

In addition, the inclined groove 61 is formed with a depth D2 that is constant with respect to the expansion surface 17*a* (refer to FIG. 4A).

In addition, the inclined groove 61 is formed with the same depth as the spiral groove 13 (D1=D2).

In addition, the inclined groove 61 is formed with the same width as the opening 13A of the spiral groove 13.

In addition, the inclined grooves 61 adjacent to each other in the circumferential direction communicate with each other through a communication space S11. The communication space S11 is formed between the expansion portion 17 and a radially inner-side end portion of the rotating seal ring 20 (refer to FIG. 4A).

Next, the operation of the stationary seal ring 10 and the rotating seal ring 20 during relative rotation will be described with reference to FIGS. 3 and 4. Incidentally, the flow of the atmosphere A in FIG. 3 is schematically illustrated without specifying a relative rotation speed of the rotating seal ring 20.

First, when the rotating seal ring 20 is not in rotation and is stopped, the atmosphere A flows into the spiral groove 13. Incidentally, since the stationary seal ring 10 is biased to a rotating seal ring 20 side by the elastic member 7, the sliding surfaces 11 and 21 are in the state of contact with each other, and there is almost no leakage of the sealed fluid F between the sliding surfaces 11 and 21 to the inner space S1.

As illustrated in FIG. 3, in a state where the rotating seal ring 20 rotates relative to the stationary seal ring 10, the atmosphere A inside the spiral groove 13 follows and moves in a rotation direction of the rotating seal ring 20 due to shear with the sliding surface 21, so that the atmosphere A in the inner space S1 is drawn into the spiral groove 13 through the inclined groove 61. Namely, the atmosphere A moves from the inclined groove 61 toward the opening 13A on the radially inner side of the spiral groove 13 as indicated by an arrow H1.

The atmosphere A that has moved toward the radially outer-side end surface 13*d* of the spiral groove 13 is increased in pressure at a corner portion 13B formed by the radially outer-side end surface 13*d* and the side surface 13*c* of the spiral groove 13 and in the vicinity of the corner portion 13B. Namely, a positive pressure is generated at the corner portion 13B of the spiral groove 13 and in the vicinity thereof.

In addition, the sliding surfaces 11 and 21 are slightly separated from each other by a force caused by the positive pressure generated at the corner portion 13B of the spiral groove 13 and in the vicinity thereof (refer to a white arrow in FIG. 4A). Accordingly, the atmosphere A inside the spiral groove 13 indicated by an arrow H2 mainly flows into a gap between the sliding surfaces 11 and 21.

Since the atmosphere A inside the spiral groove 13 indicated by the arrow H2 acts to push the sealed fluid F in the vicinity of the corner portion 13B on the radially outer side of the spiral groove 13 back to an outer space S2 side, the amount of leakage of the sealed fluid F into the spiral groove 13 or the inner space S1 is small. Incidentally, in the mechanical seal of the present embodiment, as the relative rotation speed between the stationary seal ring 10 and the rotating seal ring 20 increases, finally, only the atmosphere A exists between the sliding surfaces 11 and 21, namely, gas lubrication therebetween is realized.

In addition, as illustrated in FIG. 4A, the inclined groove 61 having the inclined bottom surface 6 inclined to expand in the depth direction is continuously provided on the radially inner side of the spiral groove 13. Accordingly, the atmosphere A that has flowed in the radial direction from a deeper position than that of the spiral groove 13 is smoothly supplied to the opening 13A on the radially inner side of the spiral groove 13 along the inclined bottom surface 6 forming the inclined groove 61. For this reason, the atmosphere A is easily introduced into the spiral groove 13, and a reduction of the atmosphere A inside the spiral groove 13 can be suppressed. In other words, a vortex is less likely to occur between the bottom surface 13*a* of the spiral groove 13 and the inclined bottom surface 6. Namely, poor lubrication between the sliding surfaces 11 and 21 during low-speed rotation can be avoided.

In addition, since the inclined groove 61 extends to the inner peripheral surface 10*g* of the stationary seal ring 10, and communicates with the inner space S1, the atmosphere A is easily introduced into the inclined groove 61 in the radial direction.

In addition, since the bottom surface 13*a* of the spiral groove 13 and the inclined bottom surface 6 form an obtuse angle, a vortex is less likely to occur at the boundary portion between the bottom surface 13*a* and the inclined bottom surface 6, namely, in the vicinity of the end edge 13*g*, and the atmosphere A is smoothly supplied from the inclined bottom surface 6 into the spiral groove 13.

In addition, the inclined groove 61 is provided continuously with the spiral groove 13. Namely, since the inclined groove 61 is provided in the stationary seal ring 10 provided with the spiral groove 13, regardless of the relative positions of the stationary seal ring 10 and the rotating seal ring 20 in the circumferential direction or in the axial direction, a communication state between the inclined groove 61 and the spiral groove 13 can always be maintained constant.

In addition, since the plurality of inclined grooves 61 are provided to be separated from each other in the circumferential direction, and the inclined grooves 61 adjacent to each other communicate with each other through the communication space S11, the atmosphere A can be introduced into the inclined grooves 61 in the radial direction (refer to the arrow H1 in FIG. 3) and in the circumferential direction (refer to an arrow H3 in FIG. 3).

In addition, since the inclined groove 61 is formed with the depth D2 that is constant with respect to the expansion surface 17*a* (refer to FIG. 4A), the atmosphere A introduced into the inclined groove 61 moves smoothly and easily along the inclined bottom surface 6 that is a bottom surface of the inclined groove 61.

In addition, since the inclined groove 61 is formed with the same depth as the spiral groove 13 (D1=D2), the fluid is easily introduced from the inclined groove 61 into the spiral groove 13.

In addition, since the expansion surfaces 17*a* may be formed in an annular shape in the stationary seal ring 10 by polishing or the like, and then the spiral grooves 13 and the inclined grooves 61 may be processed by laser or the like to form the expansion portion 17, it is easy to manufacture the stationary seal ring 10.

In addition, since the inclined groove 61 has the side surfaces 6*b* and 6*c*, the atmosphere A introduced into the inclined groove 61 is guided toward the spiral groove 13 in the radial direction.

In addition, since the expansion surface 17*a* prevents the formation of an edge on the radially inner side of the inclined groove 61, damage to a radially inner-side end portion of the spiral groove 13 during relative rotational sliding can be avoided.

Incidentally, in the present embodiment, a mode in which the expansion surface 17*a* extends between the inclined grooves 61 adjacent to each other in the circumferential direction has been provided as an example; however, the expansion surface may be interrupted on its way in the circumferential direction.

In addition, in the present embodiment, a mode in which the bottom surface of the spiral groove extends parallel to the flat surface of the lands in the radial direction has been provided as an example; however, for example, the bottom surface may be formed as an inclined surface such that the depth of the spiral groove becomes shallower toward a radially outer-side or radially inner-side end surface.

In addition, in the present embodiment, a mode in which the inclined bottom surface of the inclined groove extends parallel to the expansion surface in the radial direction has been provided as an example; however, for example, the inclined bottom surface may be formed such that the depth of the inclined groove becomes shallower toward a radially outer-side or radially inner-side end surface.

In addition, in the present embodiment, a mode in which the inclined groove and the spiral groove are formed with the same depth has been provided as an example; however, the inclined groove may be deeper than the spiral groove.

In addition, in the present embodiment, a mode in which the spiral groove is formed to expand in width from the opening on the radially inner side toward the radially outer-side end surface has been provided as an example; however, for example, the spiral groove may be formed with the same width from the opening on the radially inner side to the radially outer-side end surface, or a radially outer-side end portion may be formed in a tapered shape.

In addition, in the present embodiment, a mode in which all the spiral grooves are formed with the same depth has been provided as an example; however, for example, spiral grooves for low-speed rotation having a shallow depth and spiral grooves for high-speed rotation having a deep depth are alternately arranged in the circumferential direction of the sliding surface.

In addition, by changing each of the number and the width of the spiral grooves provided on the sliding surface, the pressure distribution may be optimized during relative rotation of the stationary seal ring and the rotating seal ring.

Second Embodiment

Next, a mechanical seal as a sliding component according to a second embodiment of the present invention will be described with reference to FIG. 5. Incidentally, the descriptions of configurations that are the same as and overlap with the configurations of the first embodiment will be omitted.

Figure 5:
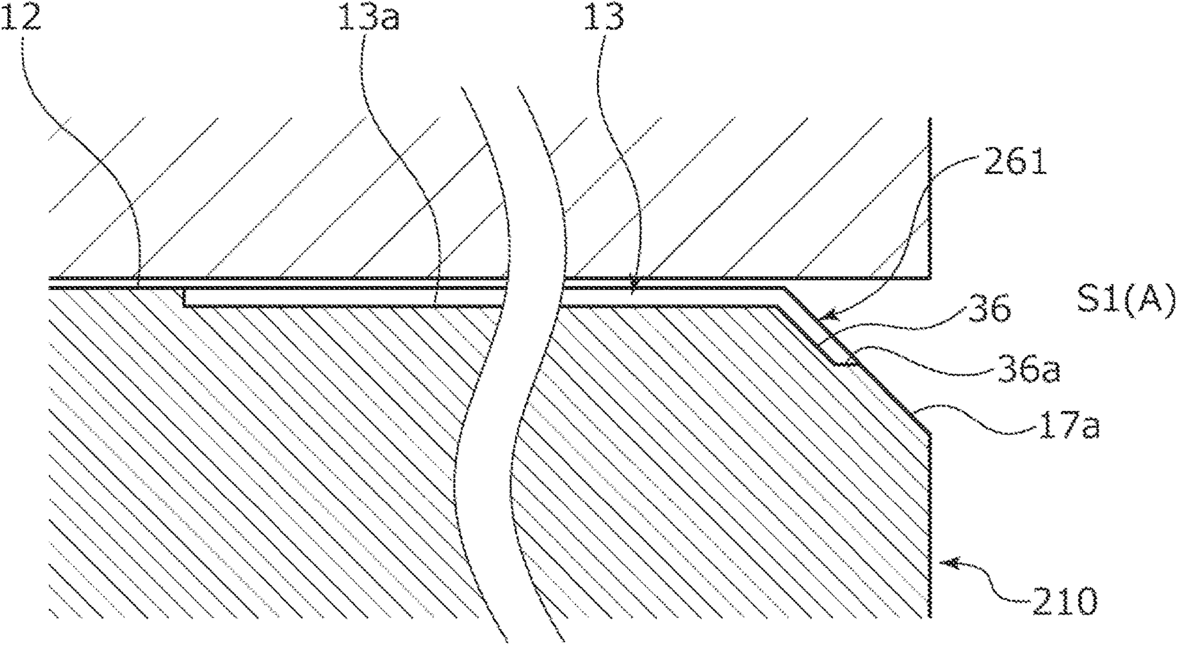
FIG. 5 is a cross-sectional view of a spiral groove and an inclined groove in a mechanical seal as a sliding component according to a second embodiment of the present invention.

As illustrated in FIG. 5, in a stationary seal ring 210 of the mechanical seal of the second embodiment, an inclined bottom surface 36 forming an inclined groove 261 extends from the end edge on the radially inner side of the bottom surface 13*a* of the spiral groove 13 to the radially inner side, and unlike the first embodiment, the inclined bottom surface 36 is not continuous to an inner peripheral surface of the stationary seal ring 210. In addition, an end surface 36*a* extending from a radially inner end of the inclined bottom surface 36 in parallel to the flat surface of the lands 12 extends further to the radially inner side, and a radially inner end of the end surface 36*a* is continuous with the expansion surface 17*a*.

Even in this case, the atmosphere A is smoothly supplied into the spiral groove 13 along the inclined bottom surface 36 forming the inclined groove 261.

Third Embodiment

Next, a mechanical seal as a sliding component according to a third embodiment of the present invention will be described with reference to FIG. 6. Incidentally, the descriptions of configurations that are the same as and overlap with the configurations of the first embodiment will be omitted.

Figure 6:
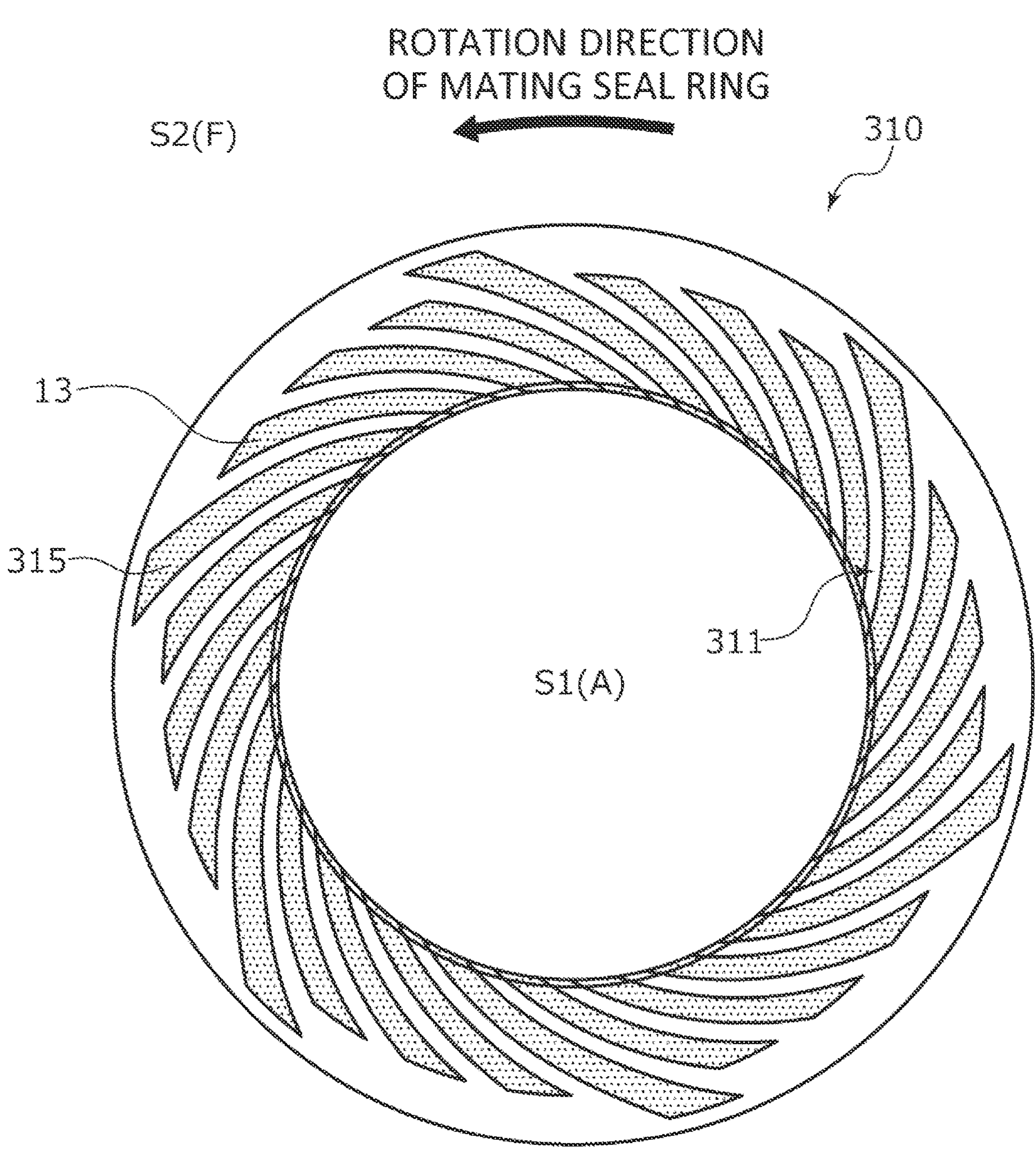
FIG. 6 is a view of a sliding surface of a stationary seal ring of a mechanical seal as a sliding component according to a third embodiment of the present invention when viewed in the axial direction.

As illustrated in FIG. 6, in the mechanical seal of the third embodiment, a plurality of spiral grooves 13 and 315 having different lengths are provided on a sliding surface 311 of a stationary seal ring 310. In detail, on the sliding surface 311, the same spiral grooves 13 as in the first embodiment and the spiral grooves 315 having a longer length in an extension direction than the spiral grooves 13 are regularly arranged in the circumferential direction. Since the operation of the stationary seal ring 310 and the rotating seal ring 20 during relative rotation is substantially the same as in the first embodiment except that the length of the spiral grooves 315 in the extension direction is changed, the description thereof will be omitted.

Fourth Embodiment

Next, a mechanical seal as a sliding component according to a fourth embodiment of the present invention will be described with reference to FIG. 7. Incidentally, the descriptions of configurations that are the same as and overlap with the configurations of the first embodiment will be omitted.

Figure 7:
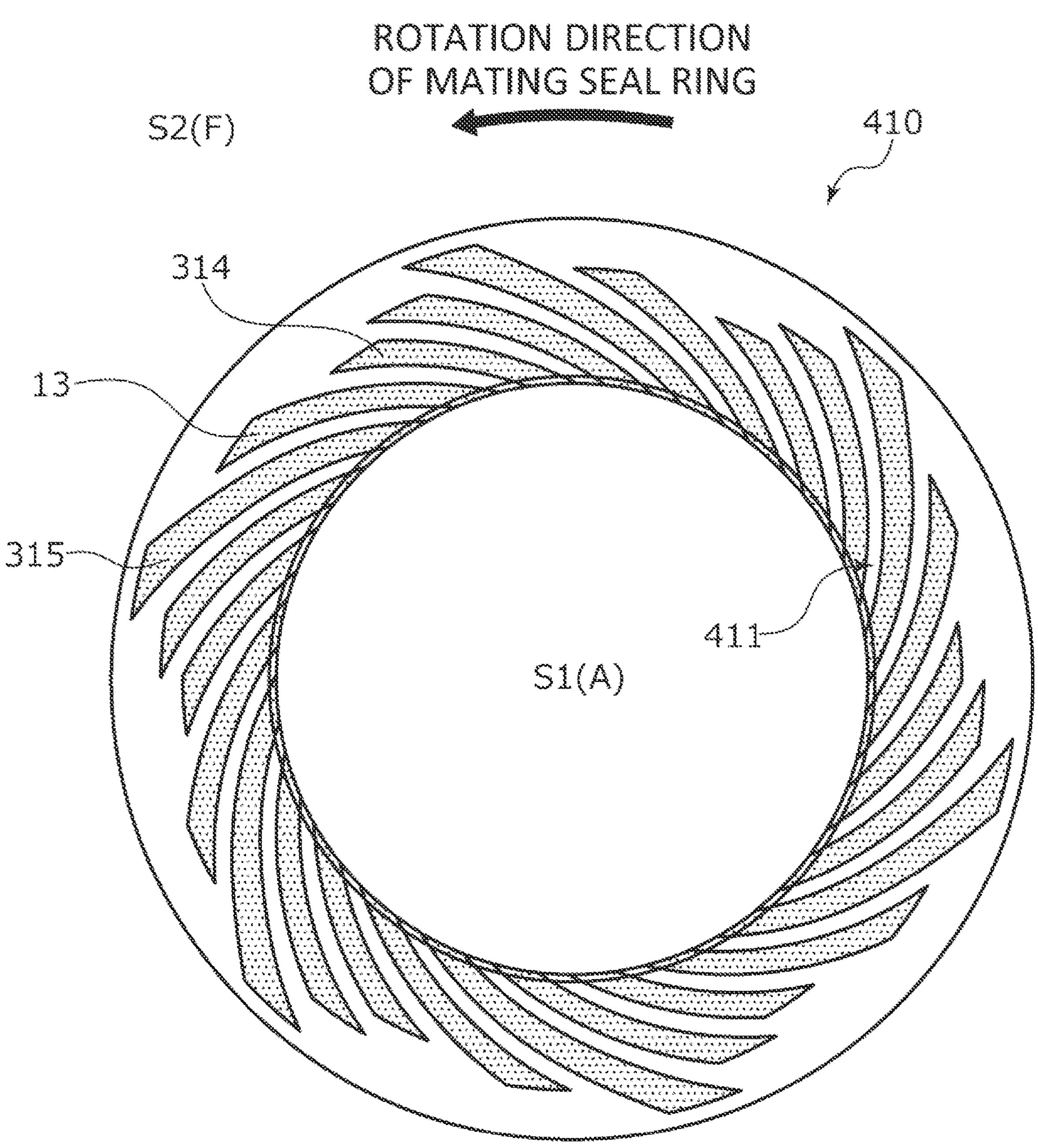
FIG. 7 is a view of a sliding surface of a stationary seal ring of a mechanical seal as a sliding component according to a fourth embodiment of the present invention when viewed in the axial direction.

As illustrated in FIG. 7, in the mechanical seal of the fourth embodiment, a plurality of spiral grooves 13, 314, and 315 having different lengths are provided on a sliding surface 411 of a stationary seal ring 410. In detail, on the sliding surface 411, the same spiral grooves 13 as in the first embodiment, the spiral grooves 314 having a shorter length in an extension direction than the spiral grooves 13, and the spiral grooves 315 having a longer length in an extension direction than the spiral grooves 13 are regularly arranged in the circumferential direction. Since the operation of the stationary seal ring 410 and the rotating seal ring 20 during relative rotation is substantially the same as in the first embodiment except that the lengths of the spiral grooves 314 and 315 in the extension directions are changed, the description thereof will be omitted.

Incidentally, a mode in which two types of the spiral grooves 13 and 315 and three types of the spiral grooves 13, 314, and 315 are regularly disposed in the circumferential direction in the third embodiment and in the fourth embodiment, respectively, has been provided as an example; however, for example, four or more types of spiral grooves may be provided, and the disposition of each spiral groove in the circumferential direction may be freely changed. Incidentally, it is preferable that the disposition of each spiral groove in the circumferential direction has regularity from the viewpoint of optimizing a pressure distribution during relative rotation of the stationary seal ring and the rotating seal ring.

Fifth Embodiment

Next, a mechanical seal as a sliding component according to a fifth embodiment of the present invention will be described with reference to FIG. 8. Incidentally, the descriptions of configurations that are the same as and overlap with the configurations of the first embodiment will be omitted.

Figure 8:
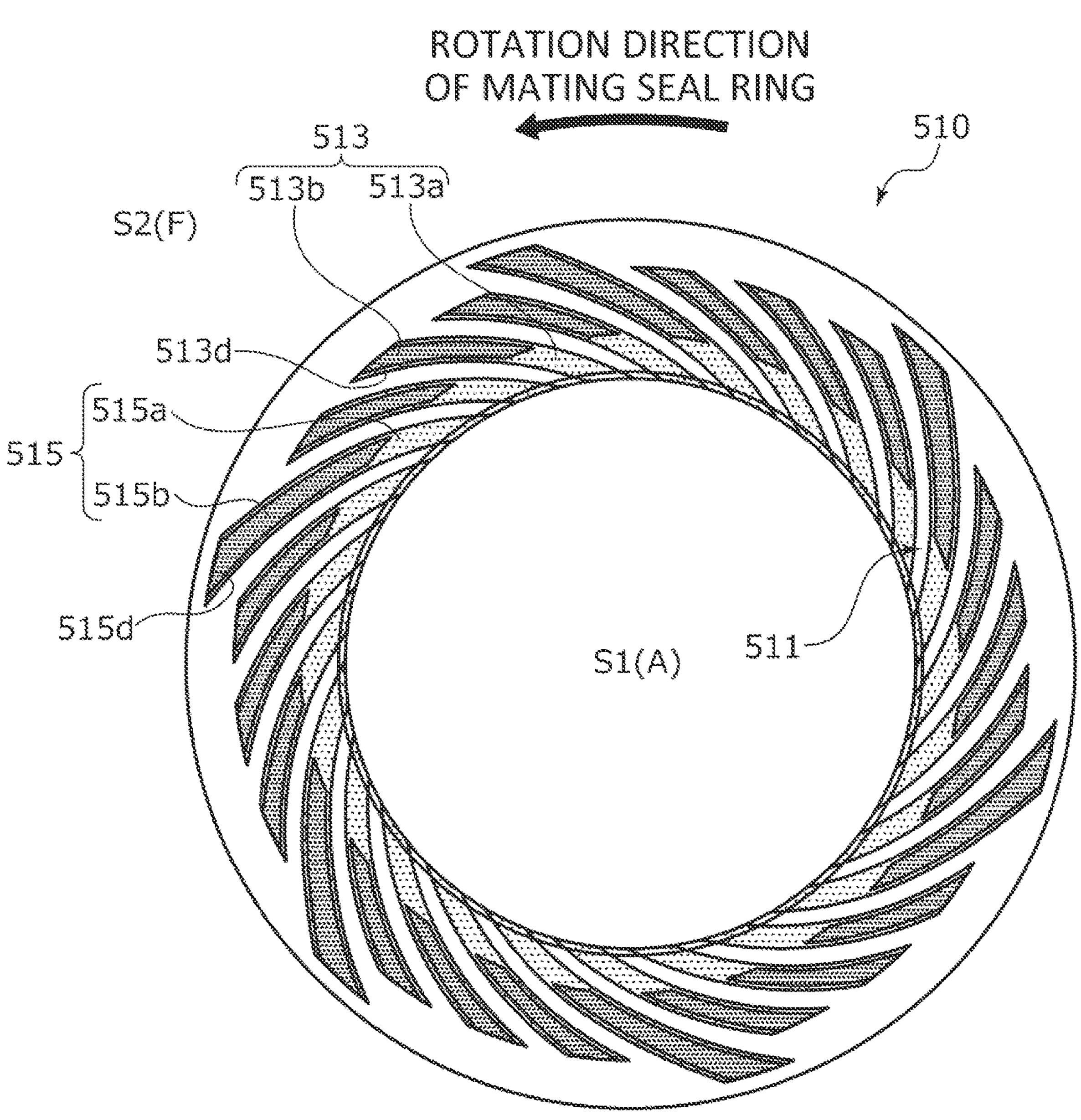
FIG. 8 is a view of a sliding surface of a stationary seal ring of a mechanical seal as a sliding component according to a fifth embodiment of the present invention when viewed in the axial direction.

As illustrated in FIG. 8, in the mechanical seal of the fifth embodiment, a plurality of spiral grooves 513 and 515 having different lengths are provided on a sliding surface 511 of a stationary seal ring 510. In detail, on the sliding surface 511, the spiral grooves 513 having the same length in an extension direction as in the first embodiment and the spiral grooves 515 having a longer length in an extension direction than the spiral grooves 513 are regularly arranged in the circumferential direction. In addition, the spiral grooves 513 and 515 include shallow groove portions 513*a* and 515*a* and deep groove portions 513*b* and 515*b*. Namely, the spiral grooves 513 and 515 are formed as stepped grooves with two stages including the shallow groove portions 513*a* and 515*a* and the deep groove portions 513*b* and 515*b*. Incidentally, the shallow groove portions 513*a* and 515*a* and the deep groove portions 513*b* and 515*b* are formed with depths that each enable the generation of a dynamic pressure.

The deep groove portions 513*b* and 515*b* are formed at radially outer-side end portions of the spiral grooves 513 and 515. The shallow groove portions 513*a* and 515*a* extend from radially inner-side end portions to radially outer-side end surfaces 513*d* and 515*d* of the spiral grooves 513 and 515 along both side surfaces.

According to this configuration, depending on the relative rotation speed between the stationary seal ring 510 and the rotating seal ring 20, in the spiral grooves 513 and 515, the groove portions that mainly generate a positive pressure can be changed. In addition, at this time, pressures generated in the deep groove portions 513*b* and 515*b* become negative pressures relative to pressures generated in the shallow groove portions 513*a* and 515*a*. For this reason, a flow in which the atmosphere A introduced into the spiral grooves 513 and 515 moves toward the radially outer-side end portions in order of the shallow groove portions 513*a* and 515*a* and the deep groove portions 513*b* and 515*b* is promoted. In addition, since the deep groove portions 513*b* and 515*b* are provided, the fluid in the spiral grooves 513 and 515 is less likely to dry out.

Incidentally, in the fifth embodiment, a mode in which the deep groove portions 513*b* and 515*b* are formed at the radially outer-side end portions of the spiral grooves 513 and 515 has been provided as an example; however, the deep groove portions may be formed at the radially inner-side end portions of the spiral grooves. Even in this case, a flow in which the atmosphere A introduced into the spiral grooves moves toward the radially outer-side end portions in order of the deep groove portions and the shallow groove portions is promoted.

In addition, in the fifth embodiment, a mode in which the spiral grooves are formed as stepped grooves with two stages including shallow groove portions and deep groove portions has been provided as an example; however, the spiral grooves may be formed as stepped grooves with three or more stages in extension directions of the grooves.

Sixth Embodiment

Next, a mechanical seal as a sliding component according to a sixth embodiment of the present invention will be described with reference to FIG. 9. Incidentally, the descriptions of configurations that are the same as and overlap with the configurations of the first embodiment will be omitted.

Figure 9:
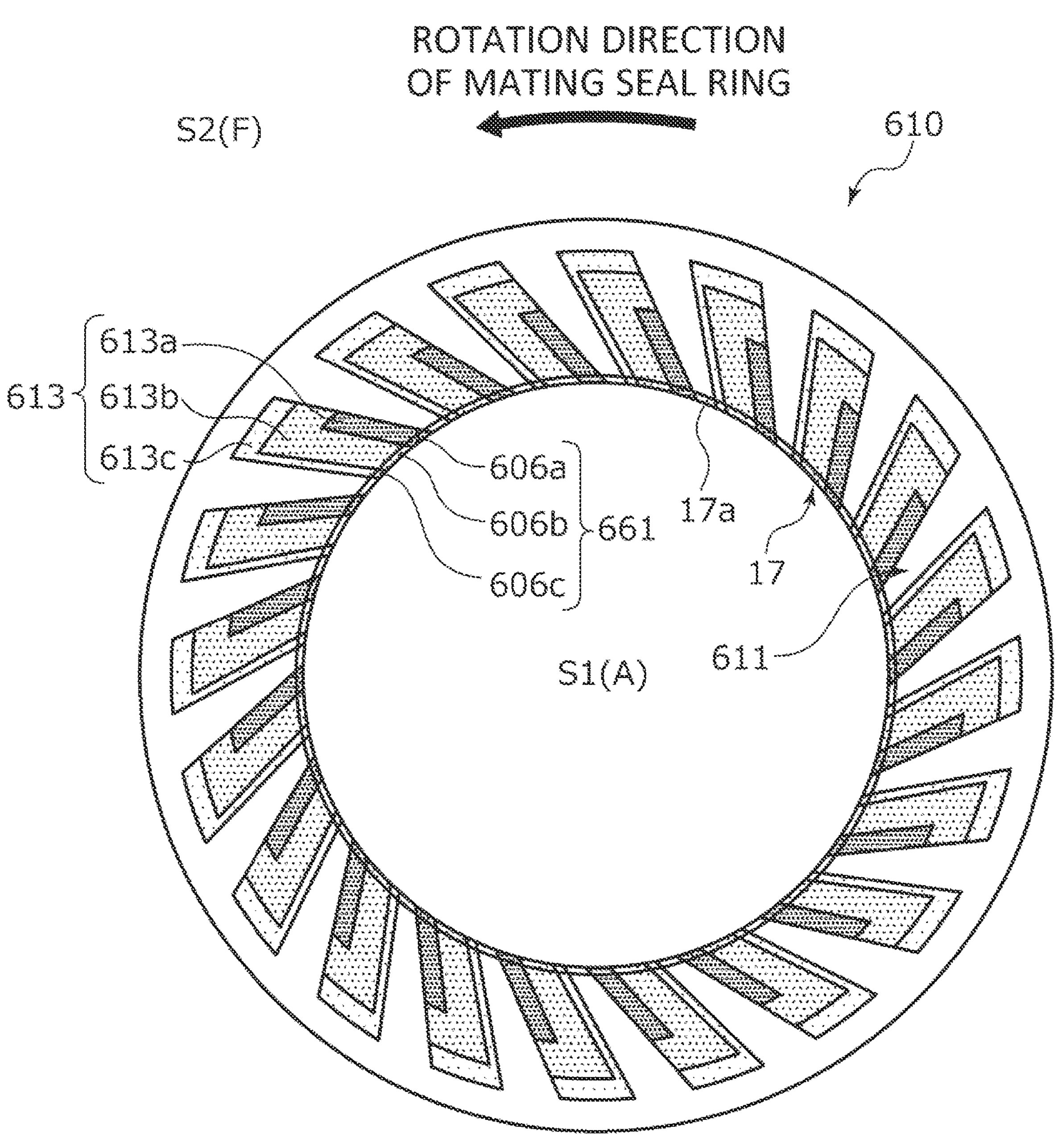
FIG. 9 is a view of a sliding surface of a stationary seal ring of a mechanical seal as a sliding component according to a sixth embodiment of the present invention when viewed in the axial direction.

As illustrated in FIG. 9, in the mechanical seal of the sixth embodiment, a plurality of spiral grooves 613 are provided on a sliding surface 611 of a stationary seal ring 610. The spiral grooves 613 extend linearly from the radially inner side toward the radially outer side while being inclined with a counterclockwise component.

The spiral grooves 613 are formed as stepped grooves of which the depth becomes shallower from the radially inner side toward the radially outer side. In detail, each of the spiral grooves 613 includes a first groove portion 613*a* having a substantially rectangular shape; a second groove portion 613*b* having a substantially L shape and having a larger width than the first groove portion 613*a*; and a third groove portion 613*c* having a substantially L shape and having a larger width than the second groove portion 613*b*. In the spiral groove 613, the depth of the first groove portion 613*a* formed on the radially inner side is at its deepest, and the depth becomes shallower in order of the second groove portion 613*b* and the third groove portion 613*c*. Namely, the spiral groove 613 is formed as a stepped groove with three stages including the first groove portion 613*a*, the second groove portion 613*b*, and the third groove portion 613*c*. Incidentally, the first groove portion 613*a*, the second groove portion 613*b*, and the third groove portion 613*c* are formed with depths that each enable the generation of a dynamic pressure.

In addition, in the first groove portion 613*a*, the second groove portion 613*b*, and the third groove portion 613*c*, a first inclined bottom surface 606*a*, a second inclined bottom surface 606*b*, and a third inclined bottom surface 606*c*, each extending to the radially inner side, are continuously provided at end edges on the radially inner side of respective bottom surfaces. In detail, the first inclined bottom surface 606*a*, the second inclined bottom surface 606*b*, and the third inclined bottom surface 606*c* are a bottom surface of an inclined groove 661. In addition, each of the first inclined bottom surface 606*a*, the second inclined bottom surface 606*b*, and the third inclined bottom surface 606*c* is parallel to the expansion surface 17*a*. Namely, the inclined groove 661 is formed as a stepped groove of which the depth becomes shallower in the relative rotation direction.

According to this configuration, depending on the relative rotation speed between the stationary seal ring 610 and the rotating seal ring 20, in the spiral groove 613, the groove portion that mainly generates a positive pressure can be changed. In addition, even in this case, a flow in which the atmosphere A introduced into the spiral groove 613 moves toward a radially outer-side end portion in order of the first groove portion 613*a*, the second groove portion 613*b*, and the third groove portion 613*c* is promoted.

Incidentally, in the sixth embodiment, a mode in which in the first groove portion 613*a*, the second groove portion 613*b*, and the third groove portion 613*c* forming the spiral groove 613, the first inclined bottom surface 606*a*, the second inclined bottom surface 606*b*, and the third inclined bottom surface 606*c* forming the inclined groove 661 are continuously provided at the end edges on the radially inner side of the respective bottom surfaces, respectively, has been provided as an example; however, for example, the spiral groove may be formed by continuously arranging the first groove portion, the second groove portion, and the third groove portion having the same width and having a substantially rectangular shape in order from the radially inner side, and the end edge on the radially inner side of the bottom surface of the first groove portion on the radially inner side of the spiral groove may be provided continuously with the inclined bottom surface of the inclined groove. Even in this case, a flow in which the atmosphere A introduced into the spiral groove moves toward the radially outer-side end portion in order of the first groove portion, the second groove portion, and the third groove portion is promoted.

In addition, in the sixth embodiment, a mode in which the spiral groove is formed as a stepped groove with three stages including the first groove portion, the second groove portion, and the third groove portion has been provided as an example; however, the spiral groove may be formed as a stepped groove with two stages or four or more stages in a with direction of the groove.

Seventh Embodiment

Next, a mechanical seal as a sliding component according to a seventh embodiment of the present invention will be described with reference to FIG. 10. Incidentally, the descriptions of configurations that are the same as and overlap with the configurations of the first embodiment will be omitted.

Figure 10:
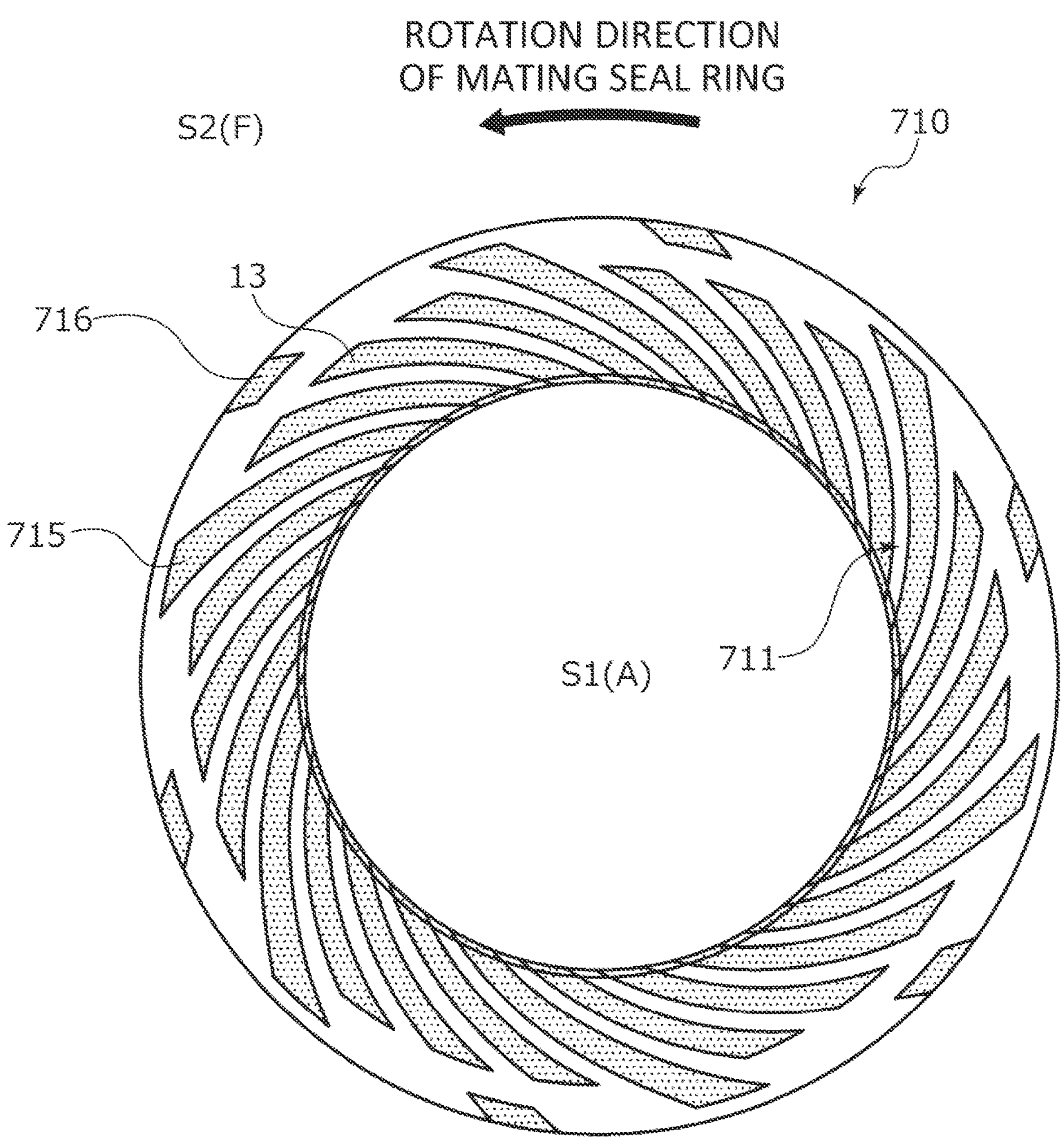
FIG. 10 is a view of a sliding surface of a stationary seal ring of a mechanical seal as a sliding component according to a seventh embodiment of the present invention when viewed in the axial direction.

As illustrated in FIG. 10, in the mechanical seal of the seventh embodiment, a plurality of spiral grooves 13 and 715 and discharge grooves 716 having different lengths are provided on a sliding surface 711 of a stationary seal ring 710. In detail, on the radially inner side of the sliding surface 711, the same spiral grooves 13 as in the first embodiment and the spiral grooves 715 having a longer length in an extension direction than the spiral grooves 13 are regularly arranged in the circumferential direction. In addition, the discharge grooves 716 (six in the seventh embodiment) are evenly arranged in the circumferential direction on the radially outer side of the sliding surface 711.

The discharge groove 716 is a spiral groove formed on the extension of the spiral groove 13 in the extension direction, and communicates with the outer space S2 and does not communicate with the inner space S1.

According to this configuration, when the atmosphere A inside the spiral groove 13 flows into the gap between the sliding surfaces 11 and 21 due to relative rotation of the stationary seal ring 710 and the rotating seal ring 20, even in a case where contamination is mixed, the contamination can be collected from between the sliding surfaces 11 and 21 into the discharge groove 716, together with the sealed fluid F or the atmosphere A, and can be discharged to the outer space S2. For this reason, wear between the sliding surfaces 11 and 21 caused by the meshing of the contamination can be suppressed.

Incidentally, in the seventh embodiment, a mode in which the shape of the discharge groove 716 is the shape of a spiral groove formed on the extension of the spiral groove 13 in the extension direction has been provided as an example; however, the shape of the discharge groove may be freely changed as long as the discharge groove communicates with the outer space S2 and does not communicate with the inner space S1.

Eighth Embodiment

Next, a mechanical seal as a sliding component according to an eighth embodiment of the present invention will be described with reference to FIG. 11. Incidentally, the descriptions of configurations that are the same as and overlap with the configurations of the first embodiment will be omitted.

Figure 11:
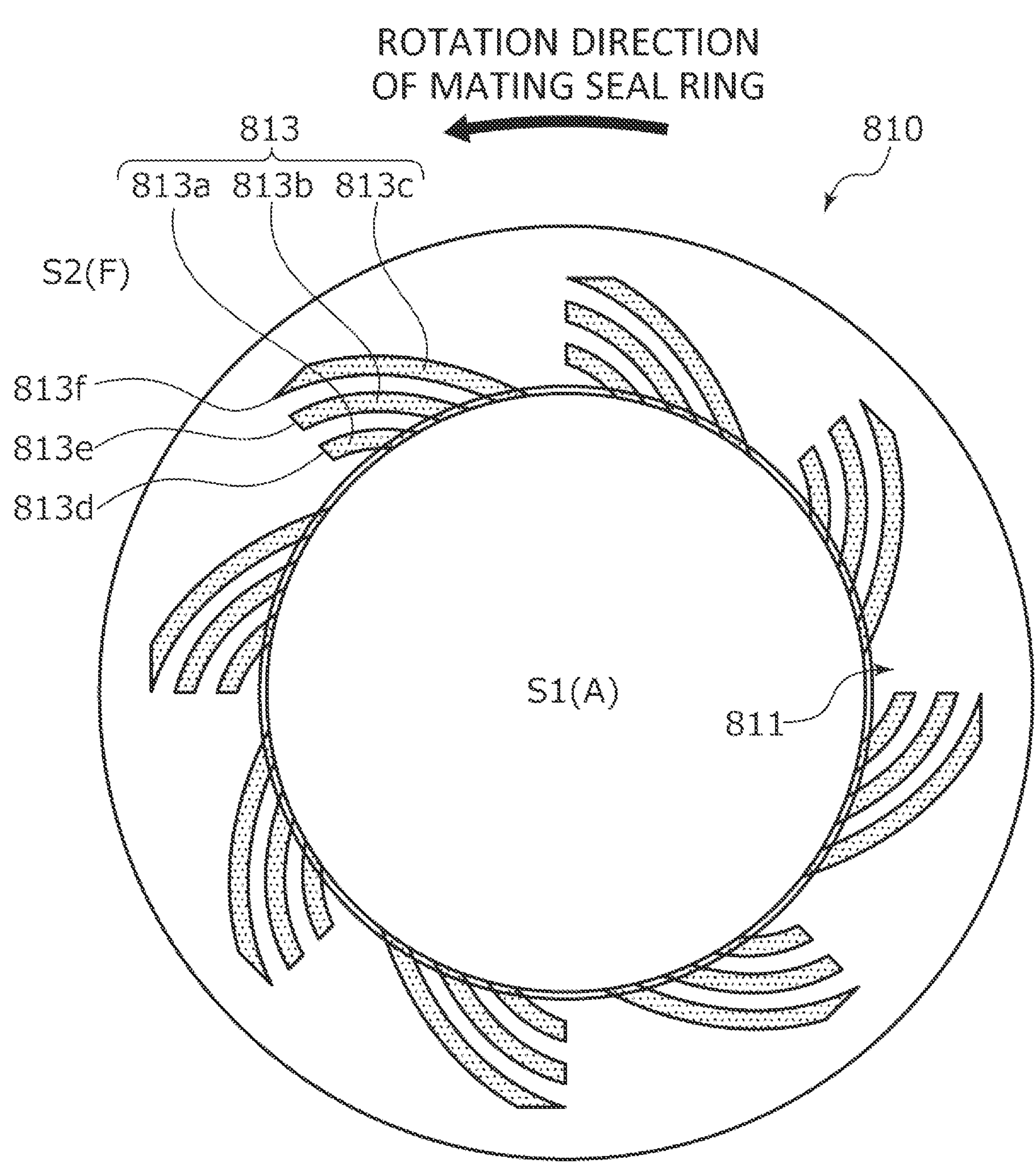
FIG. 11 is a view of a sliding surface of a stationary seal ring of a mechanical seal as a sliding component according to an eighth embodiment of the present invention when viewed in the axial direction.

As illustrated in FIG. 11, in the mechanical seal of the eighth embodiment, a plurality of dynamic pressure generation mechanisms 813 are provided on a sliding surface 811 of a stationary seal ring 810. The dynamic pressure generation mechanisms 813 (eight in the eighth embodiment) are evenly arranged in the circumferential direction on the radially inner side of the sliding surface 811.

Each of the dynamic pressure generation mechanisms 813 includes three spiral grooves 813*a*, 813*b*, and 813*c*. The spiral grooves 813*a*, 813*b*, and 813*c* extend in an arcuate shape from the radially inner side toward the radially outer side while being inclined with a counterclockwise component. In addition, the spiral grooves 813*a*, 813*b*, and 813*c* have different radial components and circumferential components in extension directions of the grooves. The spiral groove 813*a* is the shortest, and the length becomes longer in order of the spiral groove 813*b* and the spiral groove 813*c*. Incidentally, a radially outer-side end surface 813*d* of the spiral groove 813*a*, a radially outer-side end surface 813*e* of the spiral groove 813*b*, and a radially outer-side end surface 813*f* of the spiral groove 813*c* are disposed side by side at the same position in the circumferential direction, namely, linearly in the radial direction.

According to this configuration, a positive pressure can be uniformly distributed in the radial direction of the sliding surface 811 by the spiral grooves 813*a*, 813*b*, and 813*c* forming the plurality of dynamic pressure generation mechanisms 813 that are evenly arranged in the circumferential direction on the radially inner side of the sliding surface 811.

Ninth Embodiment

Next, a mechanical seal as a sliding component according to a ninth embodiment of the present invention will be described with reference to FIG. 12. Incidentally, the descriptions of configurations that are the same as and overlap with the configurations of the first embodiment will be omitted.

Figure 12:
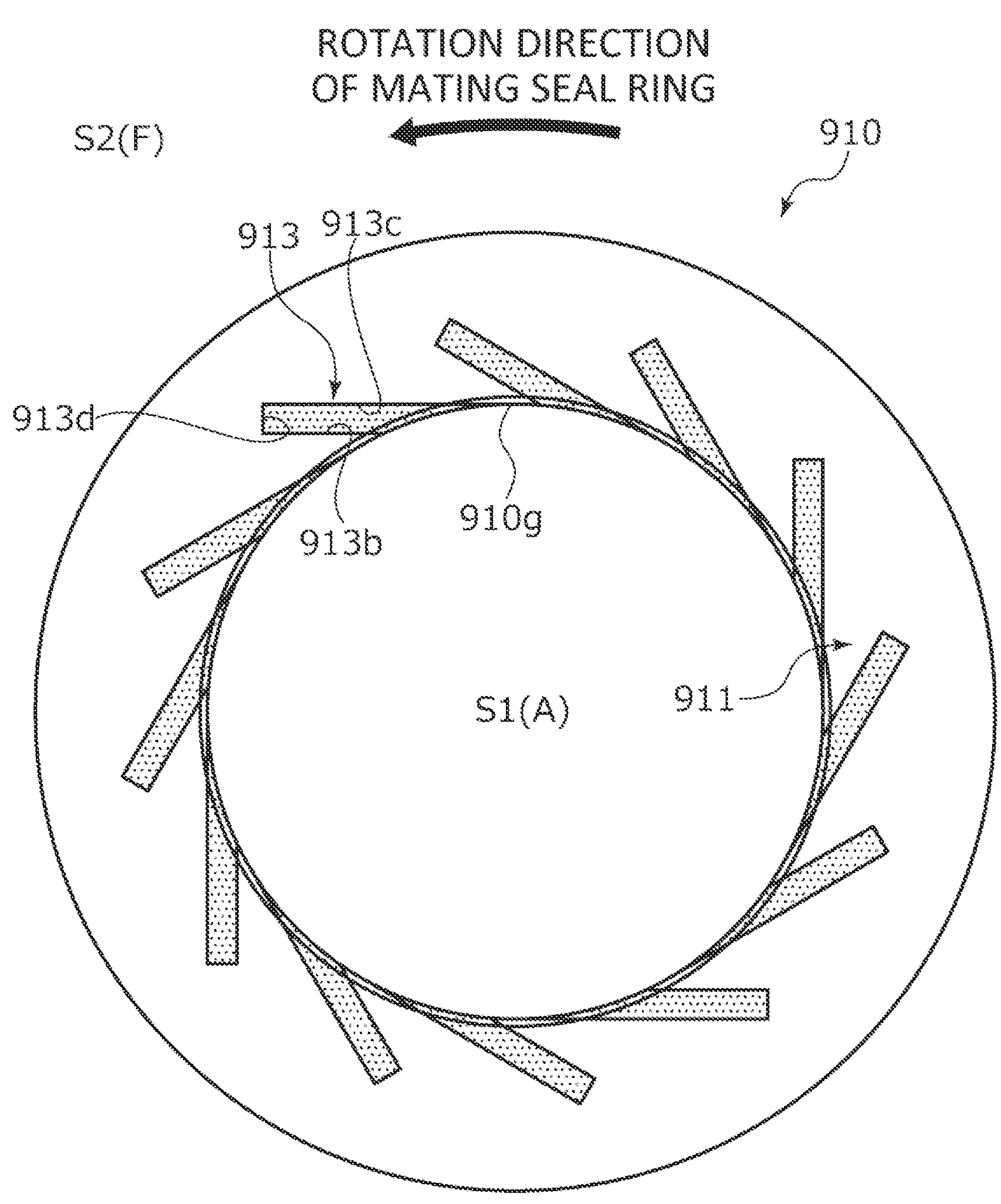
FIG. 12 is a view of a sliding surface of a stationary seal ring of a mechanical seal as a sliding component according to a ninth embodiment of the present invention when viewed in the axial direction.

As illustrated in FIG. 12, in the mechanical seal of the ninth embodiment, a plurality of spiral grooves 913 are provided on a sliding surface 911 of a stationary seal ring 910. The spiral grooves 913 (12 in the ninth embodiment) are evenly arranged in the circumferential direction on the radially inner side of the sliding surface 911.

The spiral grooves 913 extend linearly from the radially inner side toward the radially outer side while being inclined with a counterclockwise component. In detail, one side surface 913*c* of the spiral groove 913 extends in a tangential direction to an inner peripheral surface 910*g* of the stationary seal ring 910. In addition, the other side surface 913*b* of the spiral groove 913 extends parallel to the one side surface 913*c*. In addition, since a radially outer-side end surface 913*d* of the spiral groove 913 is orthogonally connected to each of radially outer ends of the side surfaces 913*b* and 913*c*, a radially outer-side end portion of the spiral groove 913 has a rectangular shape.

Tenth Embodiment

Next, a mechanical seal as a sliding component according to a tenth embodiment of the present invention will be described with reference to FIG. 13. Incidentally, the descriptions of configurations that are the same as and overlap with the configurations of the first embodiment will be omitted.

The mechanical seal of the tenth embodiment is different from the mechanical seal of the first embodiment in that spiral grooves are arranged on the radially outer side of a sliding surface. In addition, as illustrated in FIG. 13, the mechanical seal is different from the mechanical seal of the first embodiment in that the sealed fluid F exists in the inner space S1 of the mechanical seal, the atmosphere A exists in the outer space S2, the radially inner side of sliding rings forming the mechanical seal is a sealed fluid side (high-pressure side), and the radially outer side is a leakage side (low-pressure side). In addition, the mechanical seal is different from the mechanical seal of the first embodiment in that the rotating seal ring 20 slides clockwise relative to the stationary seal ring 10 as indicated by a solid arrow.

Figure 13:
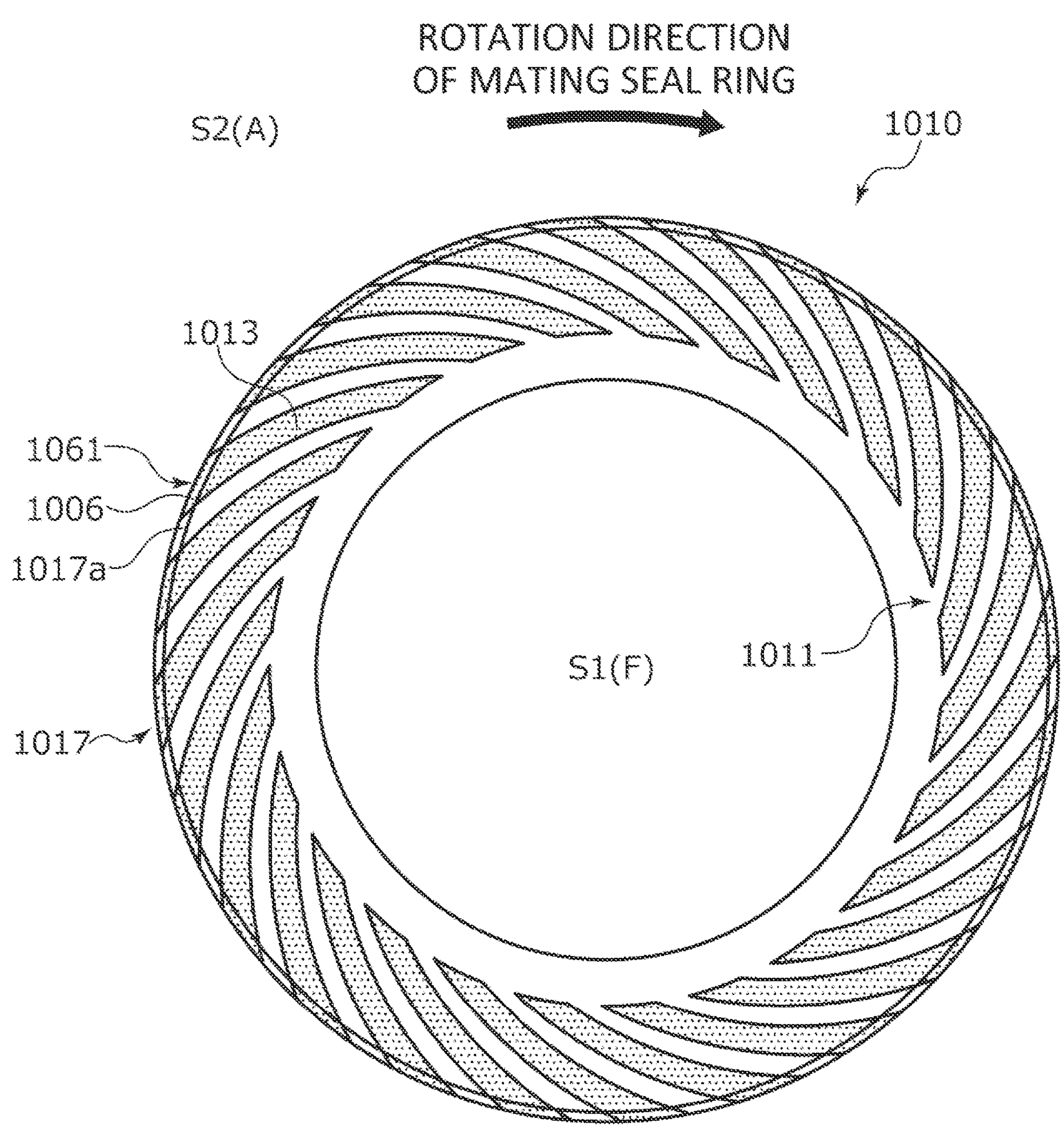
FIG. 13 is a view of a sliding surface of a stationary seal ring of a mechanical seal as a sliding component according to a tenth embodiment of the present invention when viewed in the axial direction.

As illustrated in FIG. 13, in the mechanical seal of the tenth embodiment, a plurality of spiral grooves 1013 are provided on a sliding surface 1011 of a stationary seal ring 1010. The spiral grooves 1013 (24 in the present embodiment) are evenly arranged in the circumferential direction on the radially outer side of the sliding surface 1011.

In addition, an edge portion on the outer space S2 side of the stationary seal ring 1010 is an expansion portion 1017, and a plurality of inclined grooves 1061 and expansion surfaces 1017*a* are provided. In other words, the plurality of inclined grooves 1061 and expansion surfaces 1017*a* are provided at an edge portion on the radially outer side of the sliding surface 1011 of the stationary seal ring 1010.

Even in this case, the atmosphere A is smoothly supplied into the spiral grooves 1013 along inclined bottom surfaces 1006 forming the inclined grooves 1061.

Eleventh Embodiment

Next, a mechanical seal as a sliding component according to an eleventh embodiment of the present invention will be described with reference to FIG. 14. Incidentally, the descriptions of configurations that are the same as and overlap with the configurations of the first embodiment will be omitted.

Figure 14:
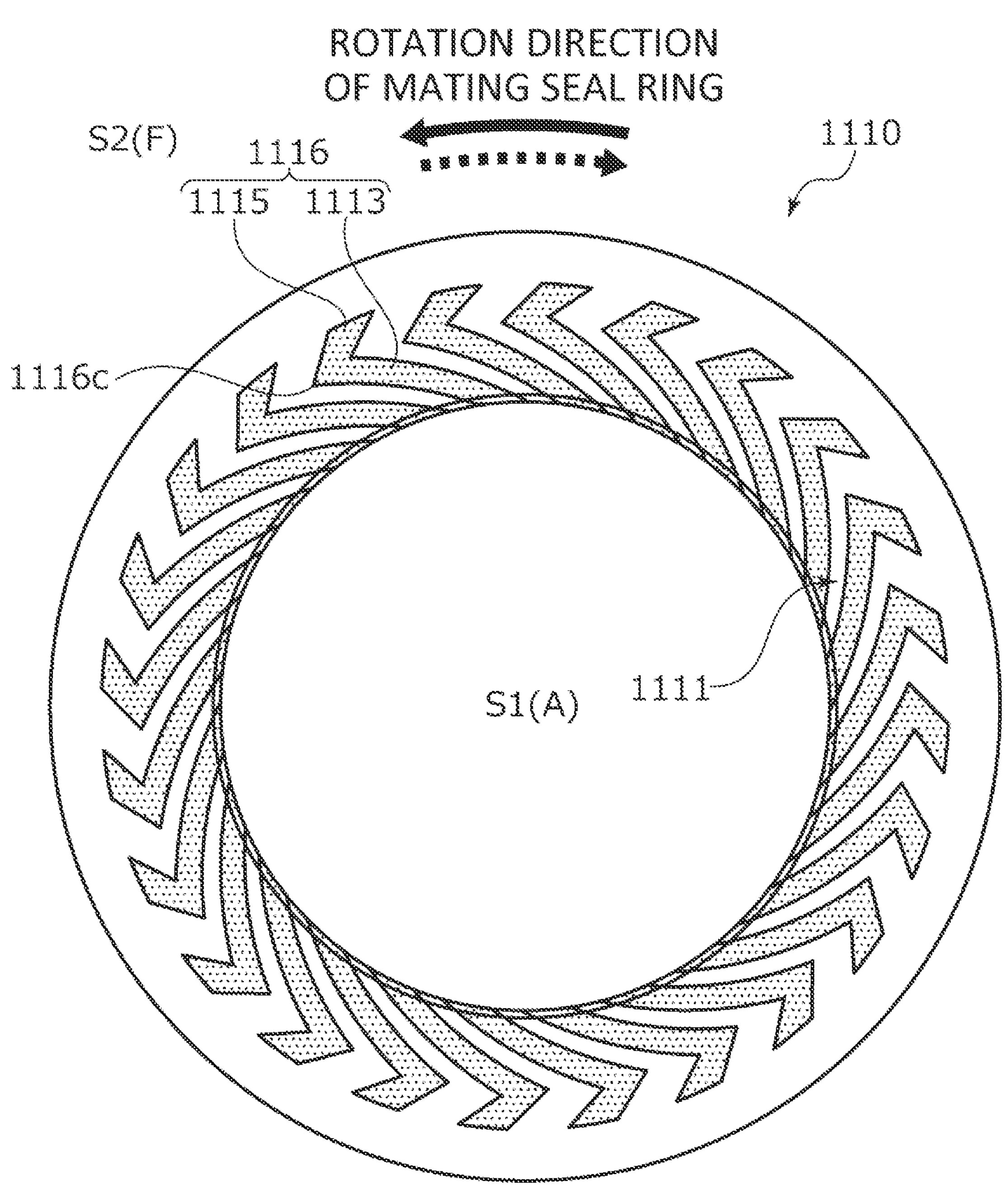
FIG. 14 is a view of a sliding surface of a stationary seal ring of a mechanical seal as a sliding component according to an eleventh embodiment of the present invention when viewed in the axial direction.

As illustrated in FIG. 14, in the mechanical seal of the eleventh embodiment, a plurality of dynamic pressure generation grooves 1116 are provided on a sliding surface 1111 of a stationary seal ring 1110. The dynamic pressure generation grooves 1116 (24 in the present embodiment) are evenly arranged in the circumferential direction on the radially inner side of the sliding surface 1111.

Each of the dynamic pressure generation grooves 1116 includes a spiral groove 1113 and a reverse spiral groove 1115 continuously formed on the radially outer side of the spiral groove 1113 and extending in a direction opposite to the spiral groove 1113 to generate a dynamic pressure, and has an L shape. Incidentally, extending in the direction opposite to the spiral groove means that the spiral groove 1113 extends from the radially inner side toward the radially outer side while being inclined with a component in a forward rotation direction, whereas the reverse spiral groove 1115 extends from the radially inner side toward the radially outer side while being inclined with a component in a reverse rotation direction.

The reverse spiral groove 1115 extends linearly from a radially inner-side end portion toward the radially outer side in the reverse rotation direction of the rotating seal ring 20 while being inclined, and a radially outer-side end portion, namely, a radially outer end of the dynamic pressure generation groove 1116 is closed not to communicate with the outer space S2. Incidentally, the reverse spiral groove 1115 is not limited to extending linearly while being inclined, and may extend in an arcuate shape.

In addition, an extension distance of the reverse spiral groove 1115 is shorter than an extension distance of the spiral groove 1113.

In addition, a depth of the reverse spiral groove 1115 is the same as a depth of the spiral groove 1113. Namely, a bottom surface of the reverse spiral groove 1115 is disposed on the same plane as a bottom surface of the spiral groove 1113 that is continuous therewith, to form a flat surface. Incidentally, the bottom surface of the spiral groove 1113 and the bottom surface of the reverse spiral groove 1115 are not limited to forming a flat surface, and may have an inclination or unevenness.

According to this configuration, during forward rotation of the rotating seal ring 20, since the atmosphere A that has flowed into a gap between the sliding surfaces 1111 and 21 from the inner space S1 is suctioned by a positive pressure generated mainly in the spiral groove 1113 of the dynamic pressure generation groove 1116, and the sealed fluid F is pushed back to the outer space S2 side, a leakage of the sealed fluid F from between the sliding surfaces 1111 and 21 to the inner space S1 can be suppressed. On the other hand, during reverse rotation of the rotating seal ring 20, the sealed fluid F that has entered the reverse spiral groove 1115 on the radially outer side of the spiral groove 1113 follows and moves due to shear with the sliding surface 21 of the rotating seal ring 20, and is returned into the gap between the sliding surfaces 1111 and 21 from the radially outer-side end portion of the reverse spiral groove 1115 toward the outer space S2 side, so that a leakage of the sealed fluid F to the inner space S1 can be reduced. In such a manner, since the dynamic pressure generation groove 1116 includes the spiral groove 1113 and the reverse spiral groove 1115 having different rotation directions for generating a main dynamic pressure, wear can be suppressed by separating the sliding surfaces 1111 and 21 from each other during both rotations, and a leakage of the sealed fluid F from between the sliding surfaces 1111 and 21 to the inner space S1 can be suppressed.

In addition, in the dynamic pressure generation groove 1116, since an L shape is formed by the spiral groove 1113 and the reverse spiral groove 1115, during forward rotation, the sealed fluid F suctioned from the radially outer end into the reverse spiral groove 1115 can be collected at an acute angle portion 1116C, together with the atmosphere A suctioned from the inner space S1 into the spiral groove 1113, to generate a positive pressure. In addition, during reverse rotation, since the sealed fluid F can be pushed back to the outer space S2 side by a dynamic pressure generated inside the reverse spiral groove 1115, the intrusion of the sealed fluid F into the spiral groove 1113 can be suppressed, and a leakage of the sealed fluid F to the inner space S1 through the spiral groove 1113 can be suppressed.

Twelfth Embodiment

Next, a mechanical seal as a sliding component according to a twelfth embodiment of the present invention will be described with reference to FIG. 15. Incidentally, the descriptions of configurations that are the same as and overlap with the configurations of the eleventh embodiment will be omitted.

Figure 15:
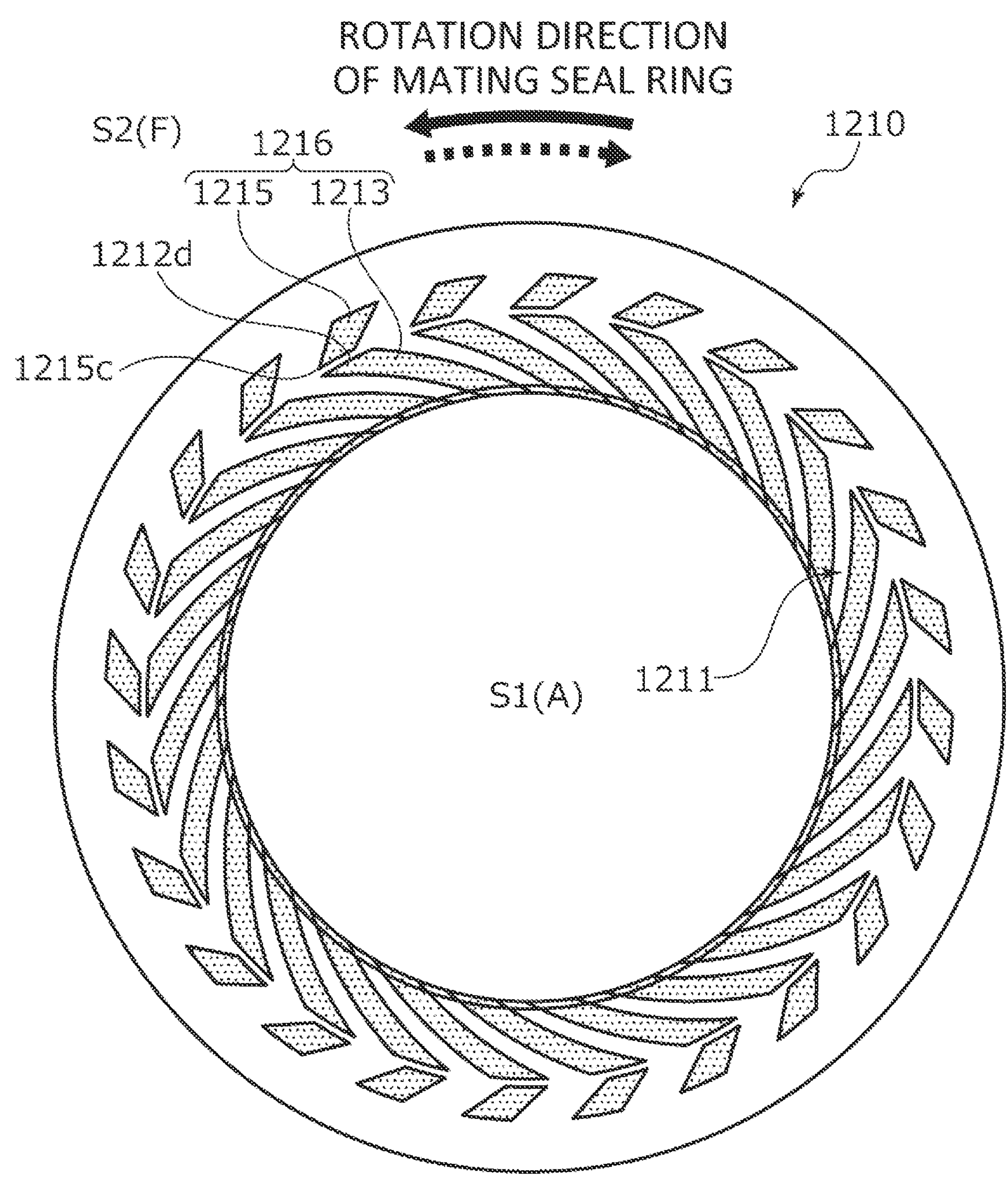
FIG. 15 is a view of a sliding surface of a stationary seal ring of a mechanical seal as a sliding component according to a twelfth embodiment of the present invention when viewed in the axial direction.

As illustrated in FIG. 15, in the mechanical seal of the twelfth embodiment, dynamic pressure generation grooves 1216 on a sliding surface 1211 of a stationary seal ring 1210 include spiral grooves 1213 extending from the radially inner side toward the radially outer side to generate a dynamic pressure, and reverse spiral grooves 1215 separated in the radial direction on the radially outer side of the spiral grooves 1213 and extending in a direction opposite to the spiral grooves 1213 to generate a dynamic pressure. Namely, the dynamic pressure generation grooves 1216 are configured such that the spiral grooves 1213 and the reverse spiral grooves 1215 are divided in the radial direction by an annular land portion 1212*d*.

In detail, the spiral groove 1213 communicates with the inner space S1 at a radially inner end, and extends in an arcuate shape from the radially inner end toward the radially outer side in the forward rotation direction of the rotating seal ring 20 while being inclined, and a linear radially outer end of the spiral groove 1213 is closed not to communicate with the reverse spiral groove 1215.

The reverse spiral groove 1215 has a substantially parallelogram, and extends linearly from a radially inner end toward the radially outer side in the reverse rotation direction of the rotating seal ring 20 while being inclined, and a radially outer end of the reverse spiral groove 1215 is closed not to communicate with the outer space S2.

According to this configuration, during forward rotation of the rotating seal ring 20, since the sealed fluid F that has flowed into a gap between the sliding surfaces 1211 and 21 from the outer space S2 is suctioned by a positive pressure generated in each of the spiral groove 1213 and the reverse spiral groove 1215 of the dynamic pressure generation groove 1216, and is pushed back to the outer space S2 side, a leakage of the sealed fluid F from between the sliding surfaces 1211 and 21 to the inner space S1 can be suppressed. On the other hand, during reverse rotation of the rotating seal ring 20, the sealed fluid F that has entered the reverse spiral groove 1215 on the radially outer side of the spiral groove 1213 follows and moves due to shear with the sliding surface 21 of the rotating seal ring 20, and is returned into the gap between the sliding surfaces 1211 and 21 from an end portion on a sealed fluid F side of the reverse spiral groove 1215 toward the radially outer side, so that a leakage of the sealed fluid F to the inner space S1 can be reduced. In such a manner, since the dynamic pressure generation groove 1216 includes the spiral groove 1213 and the reverse spiral groove 1215 having different rotation directions for generating a main dynamic pressure, wear can be suppressed by separating the sliding surfaces 1211 and 21 from each other during both rotations, and a leakage of the sealed fluid F from between the sliding surfaces 1211 and 21 to the inner space S1 can be suppressed.

In addition, since the annular land portion 1212*d* that is continuous in the circumferential direction and that has a predetermined width or more in the radial direction is formed between the spiral groove 1213 and the reverse spiral groove 1215, and the spiral groove 1213 and the reverse spiral groove 1215 are divided by the annular land portion 1212*d*, during reverse rotation of the rotating seal ring 20, the sealed fluid F is suctioned and captured from an acute angle portion 1215C into the reverse spiral groove 1215 on the radially outer side of the annular land portion 1212*d*, so that the entry of the sealed fluid F into the spiral groove 1213 over the annular land portion 1212*d* is suppressed, and a leakage of the sealed fluid F to the inner space S1 through the spiral groove 1213 can be further reduced.

In addition, since the spiral groove 1213 and the reverse spiral groove 1215 are divided by the annular land portion 1212*d*, during both rotations, the spiral groove 1213 and the reverse spiral groove 1215 do not interfere with each other in terms of the generation of a dynamic pressure, so that a dynamic pressure effect is easily exhibited.

The embodiments of the present invention have been described above with reference to the drawings; however, the specific configurations are not limited to the embodiments, and modifications or additions that are made without departing from the scope of the present invention are included in the present invention.

For example, in the embodiments, the mechanical seals have been described as examples of the sliding component, but the sliding component may be a shaft sealing component other than the mechanical seal. Further, the sliding component may be, for example, a bearing component other than the shaft sealing component.

In addition, in the first to twelfth embodiments, an example in which the spiral grooves or the reverse spiral grooves are provided in the stationary seal ring has been described; however, the spiral grooves or the reverse spiral grooves may be provided in the rotating seal ring. In other words, one sliding ring of the present invention may be the stationary seal ring or the rotating seal ring.

In addition, in the first to twelfth embodiments, the sealed fluid side and the leakage side have been described as a high-pressure side and a low-pressure side, respectively; however, the sealed fluid side and the leakage side may have substantially the same pressure.

In addition, in the first to twelfth embodiments, the sealed fluid F has been described as a high-pressure liquid, but is not limited thereto, and may be a gas or a low-pressure liquid or may be in the form of a mist that is a mixture of liquid and gas.

In addition, in the first to twelfth embodiments, the fluid on the leakage side has been described as the atmosphere A that is a low-pressure gas, but is not limited thereto, and may be a liquid or a high-pressure gas or may be in the form of a mist that is a mixture of liquid and gas.

REFERENCE SIGNS LIST

1 Rotating shaft
2 Sleeve
4 Housing
6 Inclined bottom surface
10 Stationary seal ring (first sliding ring)
10*g* Inner peripheral surface (peripheral surface on a side of first space)
11 Sliding surface
12 Land
13 Spiral groove
13A Opening
13B Corner portion
13*a* Bottom surface
13*b*, 13*c* Side surface
13*d* End surface
13*g* End edge
17 Expansion portion
20 Rotating seal ring (second sliding ring)
21 Sliding surface
61 Inclined groove
A Atmosphere
F Sealed fluid
S1 Inner space (space on leakage side)
S2 Outer space (space on sealed fluid side)
S11 Communication space

The invention claimed is:

1. A sliding component comprising a first sliding ring and a second sliding ring that slide relative to each other, wherein the first sliding ring and the second sliding ring being disposed between a sealed fluid side space and a leakage side space,
wherein the first sliding ring has a sliding surface provided with a dynamic pressure generation groove that communicates with the leakage side space,
the first sliding ring further has an expansion portion configured to permit movement of fluid in the leakage side space to the dynamic pressure generation groove and formed at an edge portion on the leakage side space such that the expansion portion is continuous from the sliding surface of the sliding ring and expanded toward the leakage side space, and
the expansion portion is provided with an inclined groove continuous with the dynamic pressure generation groove and extending toward the leakage side space.

2. The sliding component according to claim 1,
wherein the inclined groove extends to a peripheral surface on a side of the first space.

3. The sliding component according to claim 2,
wherein the inclined groove is formed by an inclined bottom surface continuous with a bottom surface of the dynamic pressure generation groove and side surfaces rising from both circumferential end edges of the inclined bottom surface.

4. The sliding component according to claim 1,
wherein a bottom surface of the dynamic pressure generation groove and a bottom surface of the inclined groove form an obtuse angle.

5. The sliding component according to claim 4,
wherein the inclined groove is formed by an inclined bottom surface continuous with a bottom surface of the dynamic pressure generation groove and side surfaces rising from both circumferential end edges of the inclined bottom surface.

6. The sliding component according to claim 1,
wherein the inclined groove is formed by an inclined bottom surface continuous with a bottom surface of the dynamic pressure generation groove and side surfaces rising from both circumferential end edges of the inclined bottom surface.

7. The sliding component according to claim 1, wherein the inclined groove is formed with a constant depth.

8. The sliding component according to claim 7, wherein a depth of the inclined groove is equal to a depth of the dynamic pressure generation groove.

9. The sliding component according to claim 1, wherein the sliding surface of the first sliding ring is further provided with a reverse dynamic pressure generation groove provided on a side of the sealed fluid side space with respect to the dynamic pressure generation groove and extending in a direction opposite to the dynamic pressure generation groove to generate a dynamic pressure.

* * * * *